(12) United States Patent
Catten et al.

(10) Patent No.: US 8,890,673 B2
(45) Date of Patent: Nov. 18, 2014

(54) SYSTEM AND METHOD FOR DETECTING USE OF A WIRELESS DEVICE IN A MOVING VEHICLE

(75) Inventors: Jonathan C. Catten, Salt Lake, UT (US); Scott McClellan, Heber City, UT (US)

(73) Assignee: inthinc Technology Solutions, Inc., West Valley City, UT (US)

( * ) Notice: Subject to any disclaimer, the term of this patent is extended or adjusted under 35 U.S.C. 154(b) by 0 days.

(21) Appl. No.: 13/012,660

(22) Filed: Jan. 24, 2011

(65) Prior Publication Data
US 2011/0115618 A1 May 19, 2011

Related U.S. Application Data

(62) Division of application No. 11/866,247, filed on Oct. 2, 2007, now Pat. No. 7,867,205.

(51) Int. Cl.
*B60Q 1/00* (2006.01)
*H04K 3/00* (2006.01)
*H04M 1/725* (2006.01)
*H04W 48/04* (2009.01)
*H04M 1/60* (2006.01)
*G07C 5/08* (2006.01)

(52) U.S. Cl.
CPC ........ *H04M 1/72577* (2013.01); *H04M 1/6075* (2013.01); *H04K 3/415* (2013.01); *G07C 5/085* (2013.01); *H04M 2250/04* (2013.01); *H04K 2203/22* (2013.01); *H04K 2203/16* (2013.01); *H04W 48/04* (2013.01); *H04M 2250/02* (2013.01)
USPC ........ 340/439; 340/445; 340/901; 455/569.2; 180/272; 701/29.1

(58) Field of Classification Search
CPC ..................... H04M 1/72572; H04M 1/72583; H04M 2203/057; H04M 2203/6054; H04M 3/4288; H04M 3/2236; G07F 7/1008; G07F 17/0014; G07F 7/0866
USPC ........... 340/439, 438, 286.01, 445, 446, 447, 340/50, 901, 904, 905; 455/405, 238.1, 455/569.2, 67.11, 569.1, 567, 91, 95, 455/414.1; 701/29, 1; 235/375, 384; 180/271, 272
See application file for complete search history.

(56) References Cited

U.S. PATENT DOCUMENTS

| | | | |
|---|---|---|---|
| 3,975,708 | A | 8/1976 | Lusk |
| 4,369,427 | A | 1/1983 | Drebinger et al. |

(Continued)

FOREIGN PATENT DOCUMENTS

| | | |
|---|---|---|
| CA | 2071931 | 12/1993 |
| CA | 2307259 | 10/2001 |

(Continued)

OTHER PUBLICATIONS

Ogle, et al.; *Accuracy of Global Positioning System for Determining Driver Performance Parameters*; Transportation Research Record 1818; Paper No. 02-1063; pp. 12-24.

(Continued)

*Primary Examiner* — George Bugg
*Assistant Examiner* — Edny Labbees
(74) *Attorney, Agent, or Firm* — Workman Nydegger (57) ABSTRACT

A system and method for detecting use of a wireless device is disclosed. In one embodiment, wireless device activity data is received from a wireless network. User account data is searched using selected parameters from the wireless device activity data to identify one or more subscribers that are or were using a wireless device. One or more subscriber vehicles or vehicle monitoring systems associated with each of the one or more subscribers are identified. Vehicle operation data from one or more vehicle monitoring systems is received. The vehicle operation data is used to determine whether any of the one or more subscriber vehicles were moving during use of an associated wireless device.

28 Claims, 4 Drawing Sheets

(56) References Cited

U.S. PATENT DOCUMENTS

| | | |
|---|---|---|
| 4,395,624 A | 7/1983 | Wartski |
| 4,419,654 A | 12/1983 | Funk |
| 4,458,535 A | 7/1984 | Juergens |
| 4,591,823 A | 5/1986 | Horvat |
| 4,785,280 A | 11/1988 | Fubini |
| 4,843,578 A | 6/1989 | Wade |
| 4,926,417 A | 5/1990 | Futami |
| 4,939,652 A | 7/1990 | Steiner |
| 5,032,821 A | 7/1991 | Domanico |
| 5,064,151 A | 11/1991 | Cerimele et al. |
| 5,074,144 A | 12/1991 | Krofchalk et al. |
| 5,119,504 A | 6/1992 | Durboraw, III |
| 5,223,844 A | 6/1993 | Mansell et al. |
| 5,225,842 A | 7/1993 | Brown et al. |
| 5,266,922 A | 11/1993 | Smith et al. |
| 5,303,163 A | 4/1994 | Ebaugh et al. ............ 364/550 |
| 5,305,214 A | 4/1994 | Komatsu |
| 5,309,139 A | 5/1994 | Austin |
| 5,311,197 A | 5/1994 | Sorden et al. |
| 5,325,082 A | 6/1994 | Rodriguez |
| 5,347,260 A | 9/1994 | Ginzel |
| 5,353,023 A | 10/1994 | Mitsugi |
| 5,359,528 A | 10/1994 | Haendel |
| 5,365,114 A | 11/1994 | Tsurushima |
| 5,365,451 A | 11/1994 | Wang et al. |
| 5,394,136 A | 2/1995 | Lammers |
| 5,400,018 A | 3/1995 | Scholl |
| 5,414,432 A | 5/1995 | Penny, Jr. et al. |
| 5,422,624 A | 6/1995 | Smith |
| 5,424,584 A | 6/1995 | Matsuda |
| 5,430,432 A | 7/1995 | Camhi |
| 5,436,612 A | 7/1995 | Aduddell |
| 5,436,837 A | 7/1995 | Gerstung |
| 5,446,659 A | 8/1995 | Yamawaki |
| 5,453,939 A | 9/1995 | Hoffman |
| 5,457,439 A | 10/1995 | Kuhn |
| 5,475,597 A | 12/1995 | Buck |
| 5,485,116 A | 1/1996 | Cserveny et al. |
| 5,485,161 A | 1/1996 | Vaughn |
| 5,499,182 A | 3/1996 | Ousborne |
| 5,521,579 A | 5/1996 | Bernhard |
| 5,521,580 A | 5/1996 | Kaneko |
| 5,525,960 A | 6/1996 | McCall |
| 5,546,305 A | 8/1996 | Kondo |
| 5,548,273 A | 8/1996 | Nicol |
| 5,570,087 A | 10/1996 | Lemelson |
| 5,581,464 A | 12/1996 | Woll |
| 5,586,130 A | 12/1996 | Doyle |
| 5,600,558 A | 2/1997 | Mearek |
| 5,612,875 A | 3/1997 | Haendel |
| 5,617,086 A | 4/1997 | Klashinsky et al. |
| 5,625,337 A | 4/1997 | Medawar |
| 5,638,077 A | 6/1997 | Martin |
| 5,642,284 A | 6/1997 | Parupalli |
| 5,648,755 A | 7/1997 | Yagihashi |
| 5,659,289 A | 8/1997 | Zonkoski |
| 5,689,067 A | 11/1997 | Klein |
| 5,708,417 A | 1/1998 | Tallman |
| 5,717,374 A | 2/1998 | Smith |
| 5,719,771 A | 2/1998 | Buck |
| 5,723,768 A | 3/1998 | Ammon |
| 5,731,285 A | 3/1998 | Pavone et al. |
| 5,731,785 A | 3/1998 | Lemelson et al. |
| 5,740,548 A | 4/1998 | Hudgens |
| 5,742,915 A | 4/1998 | Stafford |
| 5,751,245 A | 5/1998 | Janky et al. |
| 5,764,139 A | 6/1998 | Nojima |
| 5,767,767 A | 6/1998 | Lima |
| 5,777,580 A | 7/1998 | Janky et al. |
| 5,795,997 A | 8/1998 | Gittins |
| 5,797,134 A | 8/1998 | McMillan et al. |
| 5,801,618 A | 9/1998 | Jenkins et al. |
| 5,801,948 A | 9/1998 | Wood |
| 5,815,071 A | 9/1998 | Doyle |
| 5,819,198 A | 10/1998 | Peretz |
| 5,825,283 A | 10/1998 | Camhi |
| 5,825,284 A | 10/1998 | Dunwoody |
| 5,829,782 A | 11/1998 | Breed et al. |
| 5,844,475 A | 12/1998 | Horie |
| 5,847,271 A | 12/1998 | Poublon |
| 5,862,500 A | 1/1999 | Goodwin |
| 5,867,093 A | 2/1999 | Dodd |
| 5,877,678 A | 3/1999 | Donoho |
| 5,880,674 A | 3/1999 | Ufkes |
| 5,880,958 A | 3/1999 | Helms et al. |
| 5,883,594 A | 3/1999 | Lau |
| 5,892,434 A | 4/1999 | Carlson |
| 5,907,277 A | 5/1999 | Tokunaga |
| 5,914,654 A | 6/1999 | Smith |
| 5,918,180 A | 6/1999 | Dimino |
| 5,926,087 A | 7/1999 | Busch |
| 5,928,291 A | 7/1999 | Jenkins et al. |
| 5,933,080 A | 8/1999 | Nojima |
| 5,941,915 A | 8/1999 | Federle et al. ............ 701/1 |
| 5,945,919 A | 8/1999 | Trask |
| 5,949,330 A | 9/1999 | Hoffman |
| 5,949,331 A | 9/1999 | Schofield |
| 5,952,941 A | 9/1999 | Mardirossian |
| 5,954,781 A | 9/1999 | Slepian |
| 5,955,942 A | 9/1999 | Slifkin |
| 5,957,986 A | 9/1999 | Coverdill |
| 5,964,816 A | 10/1999 | Kincaid |
| 5,969,600 A | 10/1999 | Tanguay |
| 5,974,356 A | 10/1999 | Doyle et al. |
| 5,978,737 A | 11/1999 | Pawlowski |
| 5,982,278 A | 11/1999 | Cuvelier |
| 5,987,976 A | 11/1999 | Sarangapani |
| 5,999,125 A | 12/1999 | Kurby |
| 6,002,327 A | 12/1999 | Boesch |
| 6,008,724 A | 12/1999 | Thompson |
| 6,018,293 A | 1/2000 | Smith |
| 6,026,292 A | 2/2000 | Coppinger et al. |
| 6,028,508 A | 2/2000 | Mason |
| 6,028,510 A | 2/2000 | Tamam |
| 6,037,861 A | 3/2000 | Ying |
| 6,037,862 A | 3/2000 | Ying |
| 6,038,496 A | 3/2000 | Dobler |
| 6,044,315 A | 3/2000 | Honeck |
| 6,059,066 A | 5/2000 | Lary |
| 6,060,989 A | 5/2000 | Gehlot |
| 6,064,886 A | 5/2000 | Perez et al. |
| 6,064,928 A | 5/2000 | Wilson |
| 6,064,970 A | 5/2000 | McMillan et al. |
| 6,067,008 A | 5/2000 | Smith |
| 6,067,009 A | 5/2000 | Hozuka |
| 6,072,388 A | 6/2000 | Kyrtsos |
| 6,073,007 A | 6/2000 | Doyle |
| 6,075,458 A | 6/2000 | Ladner et al. |
| 6,078,853 A | 6/2000 | Ebner |
| 6,081,188 A | 6/2000 | Kutlucinar |
| 6,084,870 A | 7/2000 | Wooten et al. |
| 6,094,149 A | 7/2000 | Wilson |
| 6,098,048 A | 8/2000 | Dashefsky |
| 6,100,792 A | 8/2000 | Ogino |
| 6,104,282 A | 8/2000 | Fragoso |
| 6,108,591 A | 8/2000 | Segal et al. |
| 6,112,145 A | 8/2000 | Zachman |
| 6,121,922 A | 9/2000 | Mohan |
| 6,124,810 A | 9/2000 | Segal et al. |
| 6,130,608 A | 10/2000 | McKeown |
| 6,131,067 A | 10/2000 | Girerd et al. |
| 6,133,827 A | 10/2000 | Alvey |
| 6,138,516 A | 10/2000 | Tillman |
| 6,141,610 A | 10/2000 | Rothert |
| 6,147,598 A | 11/2000 | Murphy |
| 6,161,072 A | 12/2000 | Clapper |
| 6,172,602 B1 | 1/2001 | Hasfjord |
| 6,178,374 B1 | 1/2001 | Möhlenkamp et al. ....... 701/117 |
| 6,184,784 B1 | 2/2001 | Shibuya |
| 6,185,501 B1 | 2/2001 | Smith |
| 6,188,315 B1 | 2/2001 | Herbert et al. |
| 6,195,015 B1 * | 2/2001 | Jacobs et al. ............ 340/693.9 |
| 6,198,995 B1 | 3/2001 | Settles |
| 6,204,756 B1 | 3/2001 | Senyk |

(56) References Cited

U.S. PATENT DOCUMENTS

| | | |
|---|---|---|
| 6,204,757 B1 | 3/2001 | Evans |
| 6,208,240 B1 | 3/2001 | Ledesma |
| 6,212,455 B1 | 4/2001 | Weaver |
| 6,216,066 B1 | 4/2001 | Geoebel |
| 6,222,458 B1 | 4/2001 | Harris |
| 6,225,898 B1 | 5/2001 | Karniya |
| 6,227,862 B1 | 5/2001 | Harkness |
| 6,229,438 B1 | 5/2001 | Kutlucinar |
| 6,232,873 B1 | 5/2001 | Dilz |
| 6,246,933 B1 | 6/2001 | Bague |
| 6,246,948 B1 | 6/2001 | Thakker |
| 6,247,360 B1 | 6/2001 | Anderson |
| 6,249,219 B1 | 6/2001 | Perez |
| 6,253,129 B1 | 6/2001 | Jenkins et al. |
| 6,255,892 B1 | 7/2001 | Gartner et al. |
| 6,255,939 B1 | 7/2001 | Roth et al. |
| 6,256,558 B1 | 7/2001 | Sugiura et al. |
| 6,262,657 B1 * | 7/2001 | Okuda et al. ................ 340/439 |
| 6,262,658 B1 | 7/2001 | O'Connor |
| 6,265,989 B1 | 7/2001 | Taylor |
| 6,278,361 B1 | 8/2001 | Magiawala |
| 6,282,491 B1 | 8/2001 | Bochmann et al. |
| 6,285,931 B1 | 9/2001 | Hattori |
| 6,289,332 B2 | 9/2001 | Menig |
| 6,294,988 B1 | 9/2001 | Shomura |
| 6,294,989 B1 | 9/2001 | Schofield |
| 6,295,492 B1 | 9/2001 | Lang |
| 6,297,768 B1 | 10/2001 | Allen, Jr. |
| 6,301,533 B1 | 10/2001 | Markow |
| 6,306,063 B1 | 10/2001 | Horgan et al. ................ 477/108 |
| 6,308,120 B1 | 10/2001 | Good |
| 6,308,134 B1 | 10/2001 | Croyle et al. |
| 6,313,742 B1 | 11/2001 | Larson |
| 6,320,497 B1 | 11/2001 | Fukumoto |
| 6,331,825 B1 | 12/2001 | Ladner et al. |
| 6,333,686 B1 | 12/2001 | Waltzer |
| 6,337,653 B1 | 1/2002 | Buchler et al. |
| 6,339,739 B1 | 1/2002 | Folke |
| 6,339,745 B1 | 1/2002 | Novik ........................ 701/208 |
| 6,343,301 B1 | 1/2002 | Halt et al. |
| 6,344,805 B1 | 2/2002 | Yasui |
| 6,351,211 B1 | 2/2002 | Bussard |
| 6,353,778 B1 | 3/2002 | Brown |
| 6,356,188 B1 | 3/2002 | Meyers |
| 6,356,822 B1 | 3/2002 | Diaz |
| 6,356,833 B2 | 3/2002 | Jeon |
| 6,356,836 B1 | 3/2002 | Adolph ........................ 701/208 |
| 6,359,554 B1 | 3/2002 | Skibinski |
| 6,362,730 B2 | 3/2002 | Razavi |
| 6,362,734 B1 | 3/2002 | McQuade |
| 6,366,199 B1 | 4/2002 | Osborn |
| 6,378,959 B2 | 4/2002 | Lesesky |
| 6,385,533 B1 | 5/2002 | Halt et al. |
| 6,389,340 B1 | 5/2002 | Rayner |
| 6,393,348 B1 | 5/2002 | Ziegler |
| 6,401,029 B1 | 6/2002 | Kubota et al. |
| 6,404,329 B1 | 6/2002 | Hsu |
| 6,405,112 B1 | 6/2002 | Rayner |
| 6,405,128 B1 | 6/2002 | Bechtolsheim et al. ....... 701/208 |
| 6,415,226 B1 | 7/2002 | Kozak ........................ 701/210 |
| 6,424,268 B1 | 7/2002 | Isonaga |
| 6,427,687 B1 | 8/2002 | Kirk |
| 6,430,488 B1 | 8/2002 | Goldman |
| 6,433,681 B1 | 8/2002 | Foo |
| 6,438,472 B1 | 8/2002 | Tano et al. |
| 6,441,732 B1 | 8/2002 | Laitsaari |
| 6,449,540 B1 | 9/2002 | Rayner |
| 6,459,365 B2 | 10/2002 | Tamura |
| 6,459,367 B1 | 10/2002 | Green |
| 6,459,369 B1 | 10/2002 | Wang et al. |
| 6,459,961 B1 | 10/2002 | Obradovich |
| 6,459,969 B1 | 10/2002 | Bates |
| 6,462,675 B1 | 10/2002 | Humphrey |
| 6,472,979 B2 | 10/2002 | Schofield |
| 6,476,763 B2 | 11/2002 | Allen, Jr. |
| 6,480,106 B1 | 11/2002 | Crombez |
| 6,484,035 B2 | 11/2002 | Allen, Jr. |
| 6,484,091 B2 | 11/2002 | Shibata |
| 6,493,650 B1 | 12/2002 | Rodgers |
| 6,512,969 B1 | 1/2003 | Wang et al. |
| 6,515,596 B2 | 2/2003 | Awada |
| 6,519,512 B1 | 2/2003 | Haas |
| 6,525,672 B2 | 2/2003 | Chainer |
| 6,526,341 B1 | 2/2003 | Bird et al. |
| 6,529,159 B1 | 3/2003 | Fan et al. |
| 6,535,116 B1 | 3/2003 | Zhou |
| 6,542,074 B1 | 4/2003 | Thaman |
| 6,542,794 B2 | 4/2003 | Obradovich |
| 6,552,682 B1 | 4/2003 | Fan et al. |
| 6,556,905 B1 | 4/2003 | Mittelsteadt |
| 6,559,769 B2 | 5/2003 | Anthony |
| 6,564,126 B1 | 5/2003 | Lin |
| 6,567,000 B2 | 5/2003 | Slifkin |
| 6,571,168 B1 | 5/2003 | Murphy |
| 6,577,946 B2 * | 6/2003 | Myr ............................ 701/117 |
| 6,587,759 B2 | 7/2003 | Obradovich |
| 6,594,579 B1 | 7/2003 | Lowrey |
| 6,599,243 B2 | 7/2003 | Woltermann |
| 6,600,985 B2 | 7/2003 | Weaver |
| 6,604,033 B1 | 8/2003 | Banet |
| 6,609,063 B1 | 8/2003 | Bender et al. ................ 701/209 |
| 6,609,064 B1 | 8/2003 | Dean ............................ 701/213 |
| 6,611,740 B2 | 8/2003 | Lowrey |
| 6,611,755 B1 | 8/2003 | Coffee |
| 6,615,137 B2 | 9/2003 | Lutter et al. |
| 6,622,085 B1 | 9/2003 | Amita et al. ................ 701/208 |
| 6,629,029 B1 | 9/2003 | Giles |
| 6,630,884 B1 | 10/2003 | Shanmugham |
| 6,631,322 B1 | 10/2003 | Arthur et al. ................ 701/211 |
| 6,636,790 B1 | 10/2003 | Lightner |
| 6,639,512 B1 | 10/2003 | Lee et al. |
| 6,643,578 B2 | 11/2003 | Levine |
| 6,651,001 B2 | 11/2003 | Apsell |
| 6,654,682 B2 | 11/2003 | Kane et al. |
| 6,657,540 B2 | 12/2003 | Knapp |
| 6,662,013 B2 | 12/2003 | Takiguchi et al. |
| 6,662,141 B2 | 12/2003 | Kaub ............................ 702/181 |
| 6,664,922 B1 | 12/2003 | Fan |
| 6,665,613 B2 | 12/2003 | Duvall |
| 6,674,362 B2 | 1/2004 | Yoshioka |
| 6,675,085 B2 | 1/2004 | Straub |
| 6,677,854 B2 | 1/2004 | Dix |
| 6,678,612 B1 | 1/2004 | Khawam |
| 6,696,932 B2 | 2/2004 | Skibinski |
| 6,701,234 B1 | 3/2004 | Vogelsang |
| 6,703,925 B2 | 3/2004 | Steffel |
| 6,714,894 B1 | 3/2004 | Tobey et al. ................ 702/188 |
| 6,718,235 B1 | 4/2004 | Borugian |
| 6,718,239 B2 | 4/2004 | Rayner |
| 6,720,889 B2 | 4/2004 | Yamaki et al. |
| 6,727,809 B1 | 4/2004 | Smith |
| 6,728,542 B2 * | 4/2004 | Meda ............................ 455/445 |
| 6,728,605 B2 | 4/2004 | Lash |
| 6,732,031 B1 | 5/2004 | Lightner et al. |
| 6,732,032 B1 | 5/2004 | Banet et al. |
| 6,737,962 B2 | 5/2004 | Mayor |
| 6,741,169 B2 | 5/2004 | Magiawala |
| 6,741,170 B2 | 5/2004 | Alrabady |
| 6,745,153 B2 | 6/2004 | White |
| 6,748,322 B1 | 6/2004 | Fernandez |
| 6,750,761 B1 | 6/2004 | Newman |
| 6,750,762 B2 | 6/2004 | Porter |
| 6,756,916 B2 | 6/2004 | Yanai |
| 6,759,952 B2 | 7/2004 | Dunbridge |
| 6,766,244 B2 | 7/2004 | Obata et al. ................ 701/207 |
| 6,768,448 B2 | 7/2004 | Farmer |
| 6,775,602 B2 | 8/2004 | Gordon |
| 6,778,068 B2 | 8/2004 | Wolfe |
| 6,778,885 B2 | 8/2004 | Agashe et al. |
| 6,784,793 B2 | 8/2004 | Gagnon |
| 6,784,832 B2 | 8/2004 | Knockeart et al. |
| 6,788,196 B2 | 9/2004 | Ueda |
| 6,788,207 B2 | 9/2004 | Wilkerson |
| 6,792,339 B2 | 9/2004 | Basson |

(56) References Cited

U.S. PATENT DOCUMENTS

| | | |
|---|---|---|
| 6,795,017 B1 | 9/2004 | Puranik et al. |
| 6,798,354 B2 | 9/2004 | Schuessler |
| 6,803,854 B1 | 10/2004 | Adams et al. |
| 6,807,481 B1 | 10/2004 | Gastelum |
| 6,810,321 B1 | 10/2004 | Cook |
| 6,813,549 B2 | 11/2004 | Good |
| 6,819,236 B2 | 11/2004 | Kawai |
| 6,822,557 B1 * | 11/2004 | Weber ............... 340/425.5 |
| 6,832,141 B2 | 12/2004 | Skeen et al. |
| 6,845,314 B2 | 1/2005 | Fosseen |
| 6,845,316 B2 | 1/2005 | Yates ...................... 701/117 |
| 6,845,317 B2 | 1/2005 | Craine |
| 6,847,871 B2 | 1/2005 | Malik et al. ............... 701/33 |
| 6,847,872 B2 | 1/2005 | Bodin |
| 6,847,873 B1 | 1/2005 | Li |
| 6,847,887 B1 | 1/2005 | Casino ..................... 701/208 |
| 6,850,841 B1 | 2/2005 | Casino ..................... 701/208 |
| 6,859,039 B2 | 2/2005 | Horie |
| 6,859,695 B2 | 2/2005 | Klausner |
| 6,865,457 B1 | 3/2005 | Mittelsteadt |
| 6,867,733 B2 | 3/2005 | Sandhu et al. |
| 6,868,386 B1 | 3/2005 | Henderson et al. |
| 6,870,469 B2 | 3/2005 | Ueda |
| 6,873,253 B2 | 3/2005 | Veziris |
| 6,873,261 B2 | 3/2005 | Anthony |
| 6,879,894 B1 | 4/2005 | Lightner |
| 6,885,293 B2 | 4/2005 | Okumura |
| 6,888,495 B2 | 5/2005 | Flick |
| 6,892,131 B2 | 5/2005 | Coffee |
| 6,894,606 B2 | 5/2005 | Forbes et al. ............. 340/435 |
| 6,895,332 B2 | 5/2005 | King |
| 6,909,398 B2 | 6/2005 | Knockeart et al. |
| 6,909,947 B2 | 6/2005 | Douros et al. |
| 6,914,523 B2 | 7/2005 | Munch |
| 6,922,133 B2 | 7/2005 | Wolfe |
| 6,922,571 B1 | 7/2005 | Kinoshita |
| 6,922,616 B2 | 7/2005 | Obradovich |
| 6,922,622 B2 | 7/2005 | Dulin |
| 6,925,425 B2 | 8/2005 | Remboski |
| 6,928,348 B1 | 8/2005 | Lightner |
| 6,937,162 B2 | 8/2005 | Tokitsu |
| 6,950,013 B2 | 9/2005 | Scaman |
| 6,954,140 B2 | 10/2005 | Holler |
| 6,957,133 B1 | 10/2005 | Hunt et al. |
| 6,958,976 B2 | 10/2005 | Kikkawa |
| 6,960,168 B2 | 11/2005 | Yanagidaira et al. |
| 6,965,827 B1 | 11/2005 | Wolfson ................... 701/207 |
| 6,968,311 B2 | 11/2005 | Knockeart et al. |
| 6,970,075 B2 | 11/2005 | Cherouny |
| 6,970,783 B2 | 11/2005 | Knockeart et al. |
| 6,972,669 B2 | 12/2005 | Saito |
| 6,980,131 B1 | 12/2005 | Taylor |
| 6,981,565 B2 | 1/2006 | Gleacher |
| 6,982,636 B1 | 1/2006 | Bennie |
| 6,983,200 B2 | 1/2006 | Bodin |
| 6,988,033 B1 | 1/2006 | Lowrey |
| 6,988,034 B1 | 1/2006 | Marlatt et al. ............ 701/200 |
| 6,989,739 B2 | 1/2006 | Li |
| 7,002,454 B1 | 2/2006 | Gustafson |
| 7,002,579 B2 | 2/2006 | Olson |
| 7,005,975 B2 | 2/2006 | Lehner |
| 7,006,820 B1 | 2/2006 | Parker et al. |
| 7,019,641 B1 | 3/2006 | Lakshmanan |
| 7,023,321 B2 | 4/2006 | Brillon et al. |
| 7,023,332 B2 | 4/2006 | Saito |
| 7,024,318 B2 | 4/2006 | Fischer |
| 7,027,808 B2 | 4/2006 | Wesby |
| 7,034,705 B2 | 4/2006 | Yoshioka |
| 7,038,578 B2 | 5/2006 | Will |
| 7,042,347 B2 | 5/2006 | Cherouny |
| 7,047,114 B1 | 5/2006 | Rogers |
| 7,049,941 B2 | 5/2006 | Rivera-Cintron |
| 7,054,742 B2 | 5/2006 | Khavakh et al. .......... 701/209 |
| 7,059,689 B2 | 6/2006 | Lesesky |
| 7,065,349 B2 | 6/2006 | Nath et al. |
| 7,069,126 B2 | 6/2006 | Bernard |
| 7,069,134 B2 | 6/2006 | Williams |
| 7,072,753 B2 | 7/2006 | Eberle |
| 7,081,811 B2 | 7/2006 | Johnston |
| 7,084,755 B1 | 8/2006 | Nord |
| 7,088,225 B2 | 8/2006 | Yoshioka |
| 7,089,116 B2 | 8/2006 | Smith |
| 7,091,880 B2 | 8/2006 | Sorensen |
| 7,098,812 B2 | 8/2006 | Hirota |
| 7,099,750 B2 | 8/2006 | Miyazawa |
| 7,099,774 B2 | 8/2006 | King |
| 7,102,496 B1 | 9/2006 | Ernst |
| 7,109,850 B2 | 9/2006 | Kawazoe et al. |
| 7,109,853 B1 | 9/2006 | Mattson |
| 7,113,081 B1 | 9/2006 | Reichow |
| 7,113,107 B2 | 9/2006 | Taylor |
| 7,113,127 B1 | 9/2006 | Banet et al. |
| 7,117,075 B1 | 10/2006 | Larschan et al. |
| 7,119,696 B2 | 10/2006 | Borugian |
| 7,124,027 B1 | 10/2006 | Ernst |
| 7,124,088 B2 | 10/2006 | Bauer et al. |
| 7,129,825 B2 | 10/2006 | Weber |
| 7,132,934 B2 | 11/2006 | Allison |
| 7,132,937 B2 | 11/2006 | Lu |
| 7,132,938 B2 | 11/2006 | Suzuki |
| 7,133,755 B2 | 11/2006 | Salman |
| 7,135,983 B2 | 11/2006 | Filippov |
| 7,138,916 B2 | 11/2006 | Schwartz |
| 7,139,661 B2 | 11/2006 | Holze et al. |
| 7,145,442 B1 | 12/2006 | Wai |
| 7,149,206 B2 | 12/2006 | Pruzan |
| 7,155,259 B2 * | 12/2006 | Bauchot et al. ............ 455/564 |
| 7,155,321 B2 | 12/2006 | Bromley et al. ............ 701/29 |
| 7,161,473 B2 | 1/2007 | Hoshal |
| 7,164,986 B2 | 1/2007 | Humphries |
| 7,170,390 B2 | 1/2007 | Quinones |
| 7,170,400 B2 | 1/2007 | Cowelchuk |
| 7,174,243 B1 | 2/2007 | Lightner |
| 7,176,813 B2 | 2/2007 | Kawamata et al. |
| 7,180,407 B1 | 2/2007 | Guo |
| 7,180,409 B2 | 2/2007 | Brey |
| 7,187,271 B2 | 3/2007 | Nagata |
| 7,196,629 B2 | 3/2007 | Ruoss et al. |
| 7,197,500 B1 | 3/2007 | Israni et al. ............... 707/100 |
| 7,216,022 B2 | 5/2007 | Kynast et al. ............... 701/1 |
| 7,216,035 B2 | 5/2007 | Hortner |
| 7,218,211 B2 | 5/2007 | Ho |
| 7,222,009 B2 | 5/2007 | Hijikata |
| 7,225,060 B2 | 5/2007 | O'Conner et al. |
| 7,225,065 B1 | 5/2007 | Hunt |
| 7,228,211 B1 | 6/2007 | Lowrey |
| 7,233,235 B2 | 6/2007 | Pavlish |
| 7,236,862 B2 | 6/2007 | Kanno |
| 7,239,948 B2 | 7/2007 | Nimmo et al. |
| 7,256,686 B2 | 8/2007 | Koutsky |
| 7,256,700 B1 | 8/2007 | Ruocco |
| 7,256,702 B2 | 8/2007 | Isaacs |
| 7,260,497 B2 | 8/2007 | Watabe |
| RE39,845 E | 9/2007 | Hasfjord |
| 7,269,507 B2 | 9/2007 | Cayford ..................... 701/208 |
| 7,269,530 B1 | 9/2007 | Lin |
| 7,271,716 B2 | 9/2007 | Nou |
| 7,273,172 B2 | 9/2007 | Olsen |
| 7,280,046 B2 | 10/2007 | Berg |
| 7,283,904 B2 | 10/2007 | Benjamin |
| 7,286,917 B2 | 10/2007 | Hawkins |
| 7,286,929 B2 | 10/2007 | Staton |
| 7,289,024 B2 | 10/2007 | Sumcad |
| 7,289,035 B2 | 10/2007 | Nathan |
| 7,292,152 B2 | 11/2007 | Torkkola |
| 7,292,159 B2 | 11/2007 | Culpepper |
| 7,298,248 B2 | 11/2007 | Finley |
| 7,298,249 B2 | 11/2007 | Avery |
| 7,301,445 B2 | 11/2007 | Moughler |
| 7,308,247 B2 | 12/2007 | Thompson et al. |
| 7,317,383 B2 | 1/2008 | Ihara |
| 7,317,392 B2 | 1/2008 | DuRocher |
| 7,317,927 B2 | 1/2008 | Staton |
| 7,319,848 B2 | 1/2008 | Obradovich |

(56) References Cited

U.S. PATENT DOCUMENTS

| | | | |
|---|---|---|---|
| 7,321,294 B2 | 1/2008 | Mizumaki | |
| 7,321,825 B2 | 1/2008 | Ranalli | |
| 7,323,972 B2 | 1/2008 | Nobusawa | |
| 7,323,974 B2 | 1/2008 | Schmid | |
| 7,323,982 B2 | 1/2008 | Staton | |
| 7,327,239 B2 | 2/2008 | Gallant | |
| 7,327,258 B2 | 2/2008 | Fast | |
| 7,333,883 B2 | 2/2008 | Geborek | |
| 7,339,460 B2 | 3/2008 | Lane | |
| 7,349,782 B2 | 3/2008 | Churchill | |
| 7,352,081 B2 | 4/2008 | Taurasi | |
| 7,355,508 B2 | 4/2008 | Mian | |
| 7,362,239 B2 | 4/2008 | Franczyk et al. | |
| 7,365,639 B2 | 4/2008 | Yuhara | |
| 7,366,551 B1 | 4/2008 | Hartley | |
| 7,375,624 B2 | 5/2008 | Hines | |
| 7,376,499 B2 | 5/2008 | Salman | |
| 7,378,946 B2 | 5/2008 | Lahr | |
| 7,378,949 B2 | 5/2008 | Chen | |
| 7,386,394 B2 | 6/2008 | Shulman | |
| 7,421,334 B2 | 9/2008 | Dahlgren et al. | 701/117 |
| 7,433,889 B1 | 10/2008 | Barton | 707/104.1 |
| 7,447,509 B2 | 11/2008 | Cossins et al. | 455/457 |
| 7,474,264 B2* | 1/2009 | Bolduc et al. | 342/463 |
| 7,474,269 B2* | 1/2009 | Mayer et al. | 343/702 |
| 7,495,547 B2 | 2/2009 | Lich et al. | |
| 7,499,949 B2 | 3/2009 | Barton | 707/104.1 |
| 7,565,230 B2 | 7/2009 | Gardner et al. | 701/35 |
| 7,584,033 B2 | 9/2009 | Mittelsteadt et al. | |
| 7,589,643 B2 | 9/2009 | Dagei et al. | |
| 7,646,312 B2 | 1/2010 | Rosen | |
| 7,660,658 B2 | 2/2010 | Sheynblat | |
| 7,671,727 B2 | 3/2010 | Flick | |
| 7,697,917 B2* | 4/2010 | Camp et al. | 455/345 |
| 7,739,036 B2 | 6/2010 | Grimm et al. | |
| 7,747,410 B2 | 6/2010 | Van Esch | |
| 7,783,406 B2 | 8/2010 | Rothschild | |
| 7,821,421 B2 | 10/2010 | Tamir et al. | |
| 7,859,392 B2 | 12/2010 | McClellan et al. | |
| 7,876,205 B2 | 1/2011 | Catten | |
| 7,880,642 B2 | 2/2011 | Gueziec | 340/905 |
| 7,898,388 B2 | 3/2011 | Ehrman et al. | 340/5.8 |
| 7,941,258 B1 | 5/2011 | Mittelsteadt et al. | 701/35 |
| 8,131,205 B2 | 3/2012 | Rosen | |
| 8,188,887 B2 | 5/2012 | Catten et al. | |
| 8,233,880 B2 | 7/2012 | Johnson | |
| 8,384,555 B2 | 2/2013 | Rosen | |
| 8,461,973 B2 | 6/2013 | Reed et al. | |
| 2001/0018628 A1 | 8/2001 | Jenkins et al. | 701/35 |
| 2002/0019703 A1 | 2/2002 | Levine | |
| 2002/0024444 A1 | 2/2002 | Hiyama et al. | 340/576 |
| 2002/0111725 A1 | 8/2002 | Burge | |
| 2002/0126023 A1 | 9/2002 | Awada | |
| 2002/0128000 A1* | 9/2002 | do Nascimento, Jr. | 455/414 |
| 2003/0013460 A1 | 1/2003 | Papadias et al. | |
| 2003/0016636 A1 | 1/2003 | Tari et al. | |
| 2003/0045273 A1* | 3/2003 | Pyhalammi et al. | 455/412 |
| 2003/0055555 A1 | 3/2003 | Knockeart et al. | |
| 2003/0060950 A1 | 3/2003 | McKeown et al. | |
| 2003/0069000 A1 | 4/2003 | Kindo et al. | |
| 2003/0134660 A1* | 7/2003 | Himmel et al. | 455/557 |
| 2003/0169185 A1 | 9/2003 | Taylor | |
| 2003/0191564 A1 | 10/2003 | Haugse et al. | |
| 2004/0039504 A1 | 2/2004 | Coffee et al. | |
| 2004/0056779 A1 | 3/2004 | Rast | |
| 2004/0066330 A1 | 4/2004 | Knockeart et al. | |
| 2004/0077339 A1 | 4/2004 | Martens | |
| 2004/0083041 A1 | 4/2004 | Skeen et al. | |
| 2004/0107037 A1 | 6/2004 | Straub | |
| 2004/0142672 A1 | 7/2004 | Stankewitz | |
| 2004/0153362 A1 | 8/2004 | Bauer et al. | |
| 2004/0176083 A1* | 9/2004 | Shiao et al. | 455/417 |
| 2004/0210353 A1 | 10/2004 | Rice | 701/1 |
| 2004/0236474 A1 | 11/2004 | Chowdhary et al. | 701/1 |
| 2004/0236475 A1 | 11/2004 | Chowdhary | |
| 2004/0254698 A1 | 12/2004 | Hubbard et al. | |
| 2004/0260579 A1 | 12/2004 | Tremiti | |
| 2005/0021270 A1 | 1/2005 | Hong et al. | |
| 2005/0064835 A1 | 3/2005 | Gusler | |
| 2005/0065711 A1 | 3/2005 | Dahlgren et al. | |
| 2005/0070245 A1 | 3/2005 | Nath et al. | |
| 2005/0091018 A1 | 4/2005 | Craft | |
| 2005/0091175 A9 | 4/2005 | Farmer | |
| 2005/0096809 A1 | 5/2005 | Skeen et al. | |
| 2005/0107944 A1 | 5/2005 | Hovestadt et al. | |
| 2005/0119002 A1 | 6/2005 | Bauchot et al. | 455/441 |
| 2005/0119030 A1 | 6/2005 | Bauchot et al. | |
| 2005/0131597 A1 | 6/2005 | Raz et al. | |
| 2005/0137757 A1 | 6/2005 | Phelan et al. | 701/1 |
| 2005/0143903 A1 | 6/2005 | Park et al. | |
| 2005/0171663 A1 | 8/2005 | Mittelsteadt et al. | |
| 2005/0184860 A1* | 8/2005 | Taruki et al. | 340/441 |
| 2005/0255874 A1 | 11/2005 | Stewart-Baxter et al. | |
| 2005/0273218 A1 | 12/2005 | Breed et al. | |
| 2006/0025894 A1 | 2/2006 | Oconner et al. | |
| 2006/0112573 A1 | 6/2006 | Hillman et al. | |
| 2006/0121951 A1* | 6/2006 | Perdomo et al. | 455/572 |
| 2006/0154687 A1 | 7/2006 | McDowell | |
| 2006/0193749 A1* | 8/2006 | Ghazarian et al. | 422/83 |
| 2006/0208169 A1 | 9/2006 | Breed et al. | |
| 2006/0212195 A1 | 9/2006 | Veith et al. | |
| 2006/0220905 A1* | 10/2006 | Hovestadt | 340/901 |
| 2006/0234711 A1 | 10/2006 | McArdle | |
| 2006/0253307 A1 | 11/2006 | Warren et al. | |
| 2006/0281495 A1 | 12/2006 | Yang | |
| 2006/0284769 A1 | 12/2006 | Bolduc et al. | |
| 2007/0005404 A1 | 1/2007 | Raz et al. | |
| 2007/0057781 A1 | 3/2007 | Breed | |
| 2007/0061155 A1 | 3/2007 | Ji et al. | |
| 2007/0126601 A1 | 6/2007 | Park | |
| 2007/0186923 A1 | 8/2007 | Poutiatine et al. | 128/200.14 |
| 2007/0202929 A1* | 8/2007 | Satake | 455/569.1 |
| 2007/0229234 A1 | 10/2007 | Smith | |
| 2007/0260363 A1 | 11/2007 | Miller | |
| 2007/0293206 A1 | 12/2007 | Lund | |
| 2008/0059055 A1 | 3/2008 | Geelen et al. | |
| 2008/0064413 A1 | 3/2008 | Breed | |
| 2008/0064446 A1 | 3/2008 | Camp et al. | |
| 2008/0120175 A1 | 5/2008 | Doering | |
| 2008/0252487 A1 | 10/2008 | McClellan et al. | |
| 2008/0255722 A1 | 10/2008 | McClellan et al. | |
| 2008/0255888 A1 | 10/2008 | Berkobin | |
| 2008/0258890 A1 | 10/2008 | Follmer et al. | |
| 2008/0262670 A1 | 10/2008 | McClellan et al. | |
| 2008/0294690 A1 | 11/2008 | McClellan et al. | |
| 2008/0296968 A1 | 12/2008 | Culbert | |
| 2008/0319602 A1 | 12/2008 | McClellan et al. | |
| 2009/0024273 A1 | 1/2009 | Follmer et al. | |
| 2009/0024419 A1 | 1/2009 | McClellan et al. | |
| 2009/0079555 A1 | 3/2009 | Aguirre De Carcer et al. | |
| 2010/0035632 A1 | 2/2010 | Catten | |
| 2010/0130182 A1* | 5/2010 | Rosen | 455/414.1 |
| 2010/0131189 A1 | 5/2010 | Geelen et al. | |
| 2010/0134182 A1* | 6/2010 | Kapoor et al. | 327/541 |
| 2010/0207751 A1 | 8/2010 | Follmer et al. | |
| 2010/0207787 A1 | 8/2010 | Catten et al. | |
| 2011/0267205 A1 | 11/2011 | McClellan et al. | |
| 2012/0040650 A1 | 2/2012 | Rosen | |
| 2012/0092148 A1 | 4/2012 | Santos | |
| 2012/0181765 A1 | 7/2012 | Hill et al. | |
| 2012/0295646 A1 | 11/2012 | Johnson | |
| 2013/0150004 A1 | 6/2013 | Rosen | |

FOREIGN PATENT DOCUMENTS

| | | |
|---|---|---|
| CA | 2631103 | 11/2008 |
| DE | 197 00 353 A1 | 7/1998 |
| EP | 0843177 | 5/1998 |
| EP | 0921509 | 6/1999 |
| EP | 1811481 | 7/2007 |
| GB | 2434346 | 7/2007 |
| GB | 2454224 | 5/2009 |
| JP | 2004326492 | 11/2004 |
| JP | 2007235530 | 9/2007 |

(56) References Cited

FOREIGN PATENT DOCUMENTS

| | | |
|---|---|---|
| JP | 2005-250825 | 9/2009 |
| WO | WO 2004/019646 A1 | 4/2004 |
| WO | WO 2005003885 | 1/2005 |
| WO | WO 2005019273 | 11/2005 |
| WO | WO 2005109369 | 11/2005 |
| WO | WO 2008045320 | 8/2008 |
| WO | WO 2008109477 | 9/2008 |
| WO | WO 2013033756 | 3/2013 |
| WO | WO 2013050548 | 4/2013 |

OTHER PUBLICATIONS

Shen, et al.; *A computer Assistant for Vehicle Dispatching with Learning Capabilities*; Annals of Operations Research 61; pp. 189-211, 1995.
Tijerina, et al.; *Final Report Supplement; Heavy Vehicle Driver Workload Assessment; Task 5: Workload Assessment Protocol*; U.S. Department of Transportation; 69 pages, Oct. 1996.
Myra Blanco; *Effects of In-Vehicle Information System (IVIS) Tasks on the Information Processing Demands of a Commercial Vehicle Operations (CVO) Driver*; 230 pages, 1999.
Australian Government; *IP Australia; Patent Examination Report No. 1* for Application No. 2008307570; 5 pages, Oct. 12, 2012.
EPO Communication, Reference P040509EP CLM, Appplication No./Patent No. 08836372.6 - 1810 / 2215902 PCT/US2008011283, 9 pages, Feb. 14, 2013.
Zhu et al., "A Small Low-Cost Hybrid Orientation system and Its Error Analysis", Sensors Journal, IEEE—vol. 9, Issue 3, Digital Object Identifier: 10.1109/JSEN.2008.2012196; Publication Year: Mar. 2009, pp. 223-230.
Almazan et al., "Full auto-calibration of a smartphone on board a vehicle using IMU and GPS embedded sensors", Intelligent Vehicles Symposium (IV), 2013 IEEE; Digital Object Identifier: 10.1109/IVS.2013.6629658; Publication Year: Jun. 2013, pp. 1374-1380.
Lupton et al., "Efficient Integration of Inertial Observations Into Visual SLAM Without Initialization", Intelligent Robots and Systems, 2009, IROS 2009, IEEE/RSJ International Conference on: Digital Object Identifier: 10.1109/IROS.2009.5354267, Publication Year: Oct. 2009, pp. 1547-1552.
Mungula et al., "Attitude and Heading System Based on EKF Total State Configuration", Industrial Electronics (ISIE), 2011 IEEE International Symposium on; Digital Object Identifier: 10.1109/ISIE.2011.5984493; Publication Year: Jun. 2011, pp. 2147-2152.
Huddle et al., "Application of Inertial Navigation Systems to Geodetic Position and Gravity Vector Survey", Decision and Control including the 17th Symposium on Adaptive Processes, 1978 IEEE Conference on; vol. 17, Part 1; Digital Object Identifier: 10.1109/CDC.1978.267967; Publication Year: 1978, pp. 459-465. (The month of Publication is irrelevant since the year of Publication is clearly prior to the filing of the Application).
Zhao Yan et al., "Attitude Measurement of Drivers Head Based on Accelerometer and Magnetoresistive Sensor", Fluid Power and Mechatronics (FPM), 2011 International Conference on; Digital Object Identifier: 10.1109/FPM.2011.6045836; Publication Year: Aug. 2011, pp. 613-617.
U.S. Appl. No. 11/805,237, mail dated Oct. 28, 2013, Notice of Allowance.
Phuyal B., "An Experiment for a 2-D and 3-D GPS/INS configuration for land vehicle applications", Position Location and Navigation Symposium, 2004, PLANS 2004, Digital Object Identifier: 10.1109/PLANS.2004.1308987; Publication Year: 2004, pp. 148-152. (The month of Publication is irrelevant since the year of Publication is clearly prior to the filing of the Application).
Roberts et al., "Position Control of VTOL UAVs using IMU and GPS Measurements", Decision and Control and European Conference (CDC-ECC), 2011 50th IEEE Conference on, Digital Object Identifier, 10.1109/CDC.2011.6160854, Publication Year: Dec. 2011, pp. 8082-8087.
Cho et al., "Obeservability Analysis of the INS/GPS Navigation System on the Measurements in Land Vehicle Applications", Control, Automation and Systems, 2007, ICCAS '07, International Conference on Digital Object Identifier: 10.1109/CCAS.2007.4407018, Publication Year: Oct. 2007, pp. 841-846.
Vukajovic et al., "The Practical Design of In-Vehicle Telematics Device with GPS and MEMS Accelerometers", Telecommunications Forum (TELFOR), 2011 19th: Digital Object Identifier: 10.1109/TELFOR.2011.6143692, Publication Year: Nov. 2011, pp. 908-911.
U.S. Appl. No. 11/805,238, Jun. 30, 2009, Office Action.
U.S. Appl. No. 11/755,556, Sep. 1, 2009, Office Action.
U.S. Appl. No. 11/866,247, Sep. 29, 2009, Office Action.
U.S. Appl. No. 11/779,176, Mar. 17, 2010, Office Action.
U.S. Appl. No. 11/805,238, Apr. 26, 2010, Notice of Allowance.
U.S. Appl. No. 11/755,556, May 4, 2010, Office Action.
U.S. Appl. No. 11/866,247, Jun. 25, 2010, Notice of Allowance.
U.S. Appl. No. 11/805,237, Nov. 8, 2010, Office Action.
U.S. Appl. No. 11/866,247, Nov. 29, 2010, Notice of Allowance.
U.S. Appl. No. 11/768,056, Jan. 18, 2011, Office Action.
U.S. Appl. No. 12/222,260, Jan. 19, 2011, Office Action.
U.S. Appl. No. 12/379,153, Jul. 29, 2011, Office Action.
U.S. Appl. No. 12/379,154, Aug. 1, 2011, Office Action.
U.S. Appl. No. 11/805,237, Aug. 8, 2011, Office Action.
U.S. Appl. No. 11/779,176, Aug. 18, 2011, Office Action.
U.S. Appl. No. 11/768,056, Sep. 16, 2011, Office Action.
U.S. Appl. No. 12/222,260, Oct. 14, 2011, Office Action.
U.S. Appl. No. 12/379,153, Dec. 16, 2011, Office Action.
U.S. Appl. No. 12/379,154, Jan. 30, 2012, Notice of Allowance.
U.S. Appl. No. 11/805,237, Feb. 1, 2012, Office Action.
U.S. Appl. No. 11/768,056, Feb. 16, 2012, Office Action.
U.S. Appl. No. 12/222,260, Mar. 19, 2012, Office Action.
U.S. Appl. No. 11/805,237, Jun. 15, 2012, Office Action.
U.S. Appl. No. 11/768,056, Jul. 19, 2012, Office Action.
U.S. Appl. No. 12/379,153, Jul. 31, 2012, Notice of Allowance.
U.S. Appl. No. 12/222,260, Nov. 7, 2012, Office Action.
U.S. Appl. No. 11/805,237, Dec. 3, 2012, Office Action.
U.S. Appl. No. 11/779,176, Dec. 3, 2012, Office Action.
U.S. Appl. No. 12/222,260, Jun. 5, 2013, Office Action.
U.S. Appl. No. 11/805,237, Jun. 6, 2013, Office Action.
U.S. Appl. No. 11/768,056, Jun. 21, 2013, Office Action.
U.S. Appl. No. 11/779,176, Jul. 1, 2013, Notice of Allowance.
U.S. Appl. No. 12/379,153, Aug. 14, 2013, Notice of Allowance.
U.S. Appl. No. 12/975,489, Oct. 3, 2013, Office Action.
U.S. Appl. No. 11/768,056, Feb. 2, 2014, Office Action.
U.S. Appl. No. 11/755,556, Jun. 10, 2014, Office Action.

\* cited by examiner

SYSTEM AND METHOD FOR DETECTING USE OF A WIRELESS DEVICE IN A MOVING VEHICLE

This application is a division of U.S. application Ser. No. 11/866,247 filed Oct. 2, 2007, entitled "System and Method for Detecting the Use of a Wireless Device in a Moving Vehicle," which application is hereby incorporated herein by reference in its entirety for all purposes.

TECHNICAL FIELD

The present invention relates generally to a system and method for detecting the use of wireless devices, such as mobile phones, in moving vehicles.

BACKGROUND

The use of wireless devices, such as cellular telephones or personal digital assistants (PDA), by drivers who talk on the phone or send or read text messages while driving has been shown to reduce the drivers' attention and to increase the likelihood of accidents. Some cities restrict cellular phone use while driving or require that the driver use a hands-free mode on their wireless phone to talk while driving. Other cities are considering restricting the use of text messaging applications while driving. Such legal measures may reduce the use of wireless devices, but these measures are also easily avoided, for example, by pausing the conversation and putting the phone out of sight if a police car is nearby. There is currently no automatic method or system for detecting wireless device use by drivers in a moving vehicle.

SUMMARY OF THE INVENTION

These and other problems are generally solved or circumvented, and technical advantages are generally achieved, by preferred embodiments of the present invention in which wireless device or cellular phone usage data from cellular network operators, for example, is compared to vehicle operation data from vehicle monitoring systems, for example, to determine in real-time, near real-time, or after the fact, whether a driver is or was using a wireless device while operating a vehicle.

In one embodiment, wireless device activity data is received from a wireless network. User account data is searched using selected parameters from the wireless device activity data to identify one or more subscribers that are or were using a wireless device. One or more subscriber vehicles or vehicle monitoring systems associated with each of the one or more subscribers are identified. Vehicle operation data from one or more vehicle monitoring systems is received. The vehicle operation data is used to determine whether any of the one or more subscriber vehicles were moving during use of an associated wireless device.

The wireless device activity data includes a location identifying where a wireless device was used, or a time when the wireless device was used, or both. Messages identify wireless devices that are located in or near a particular vehicle. The wireless devices that are located in or near a particular vehicle may be determined using a short-range communications system, an RFID system, or a Bluetooth system or a combination of one or more such systems. Mentoring feedback may be provided to drivers of the one or more subscriber vehicles that were moving during use of an associated wireless device. Notification may also be sent to third parties to report movement of the one or more subscriber vehicles during use of an associated wireless device. A request may be sent to the wireless network to terminate or block communications to the associated wireless device. The wireless device activity data may be real-time data, near real-time data, or historical data.

In another embodiment, a system and method for detecting wireless device use in a moving vehicle comprises receiving a first set of wireless device activity data, wherein the first set of data identifies a first location in which a particular wireless device has been used; receiving a second set of wireless device activity data, wherein the second set of data identifies a second location in which the particular wireless device has been used; and if the first location and second location are different, then notifying a third party that the particular wireless device was in use while moving and/or providing mentoring feedback to a user associated with the particular wireless device.

The method may further comprise determining a speed associated with the distance between the first and second location, and notifying the third party only if the speed is greater than a predetermined threshold. The first and second set of wireless device activity data may be from a wireless network, wireless device, or vehicle monitoring system, for example.

In another embodiment, a system and method for detecting use of a wireless device comprises a vehicle monitoring system mounted in the vehicle, the vehicle monitoring system having a processor for processing data received from vehicle systems and sensors, and wherein the processor is configured to determine when the vehicle is moving. A radio frequency (RF) sensor mounted in the vehicle and coupled to the monitoring system, wherein the RF sensor is configured to detect signals in a wireless communication frequency band and to provide data to the processor upon detection of the signals. The RF sensor may be configured to detect signals originating from a wireless device. The processor or RF sensor may be configured to identify a source or destination address for captured signals in the wireless communication frequency band.

In a further embodiment, a system and method for detecting use of a wireless device comprises capturing radio frequency (RF) signals via an RF sensor mounted in a vehicle, detecting motion of the vehicle using a vehicle monitoring system mounted in the vehicle, linking the captured radio frequency signals to a wireless device associated with the vehicle. The captured RF signals may be linked to the wireless device associated with the vehicle using source or destination address data in the RF signals. The captured RF signals may be linked to the wireless device associated with the vehicle based upon a signal strength of the captured RF signals. The captured RF signals may be linked to the wireless device associated with the vehicle based upon a message type of the captured RF signals. Mentoring messages may be provided to a driver of the vehicle when the vehicle monitoring system detects a situation in which the vehicle is moving and the wireless device associated with the vehicle is being used.

In an alternative embodiment, a system and method for evaluating driver behavior, comprises receiving data identifying when a wireless device is in use, receiving data identifying when a vehicle is in motion, correlating the wireless device to the vehicle, and providing mentoring feedback to a driver of the vehicle and/or reporting a use of the wireless device while driving to a third party. The mentoring feedback may include an audible message or tone played to the driver, or a warning light or text message displayed to the driver, or a combination of multiple audible or visual warnings. The wireless device may be correlated to the vehicle using data stored in a user account database, using a radio frequency sensor in the vehicle, or using a short-range communications system, an RFID system, or a Bluetooth system, or a combination of one or more short-range, RFID and Bluetooth systems.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The present invention provides many applicable inventive concepts that can be embodied in a wide variety of specific contexts. The specific embodiments discussed are merely illustrative of specific ways to make and use the invention, and do not limit the scope of the invention.

Figure 1:
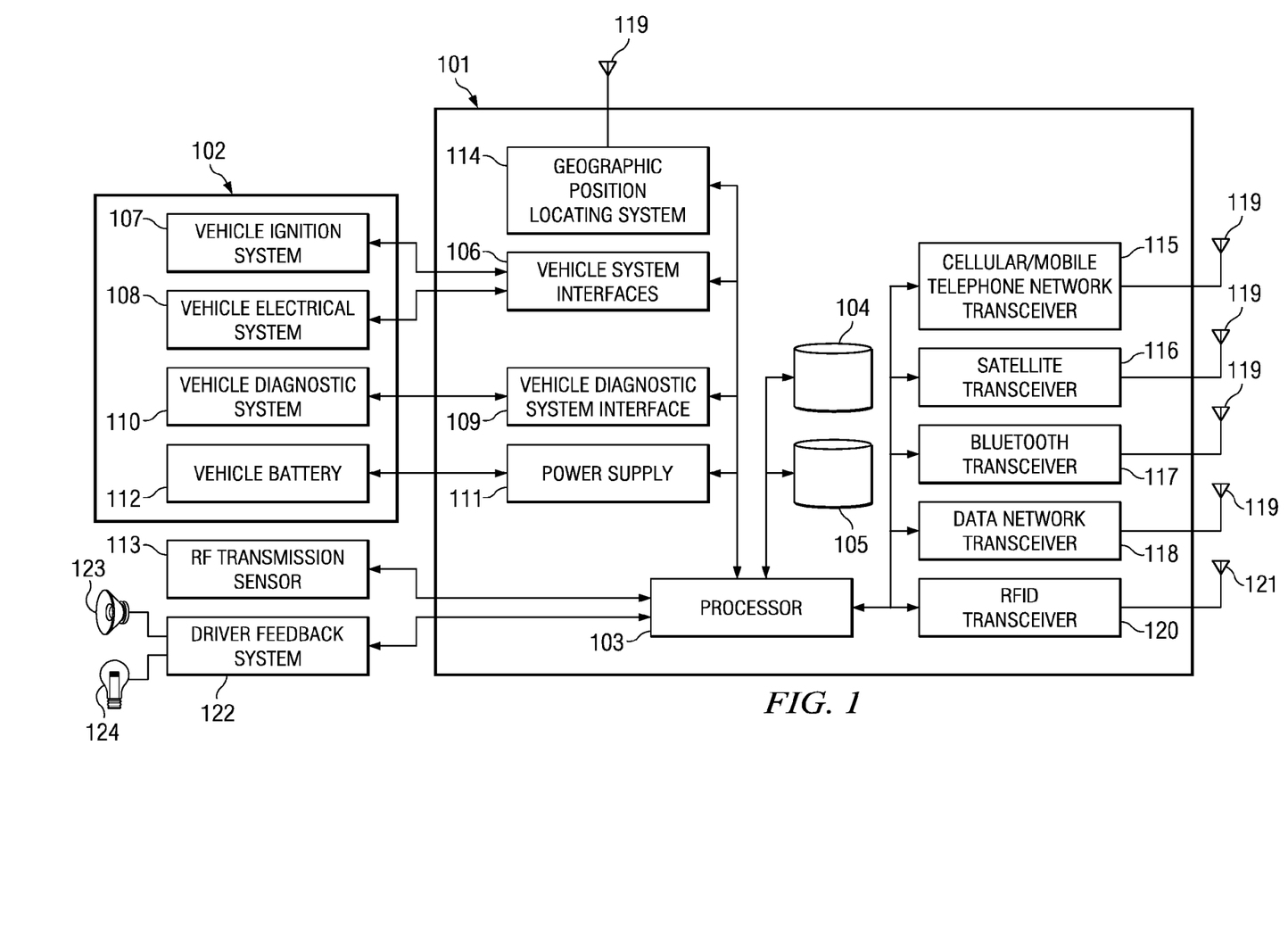
FIG. 1 is a high-level block diagram of a vehicle monitoring system according to one embodiment.

With reference to FIG. 1, there is shown vehicle monitoring system 101 that is coupled to one or more systems in vehicle 102. Processor 103 controls the operation of monitoring system 101. Processor 103 may be a general use processing device having software designed to control system 101. Alternatively, processor 103 may be a specially designed circuit or device, such as an application specific integrate circuit (ASIC), that is particularly designed for use in system 101. Processor 103 may use firmware or software, such as an operating system, for control and operation. Firmware, software and other data may be stored in random access memory (RAM) 104, read only memory (ROM) 105, electrically erasable programmable memory (EEPROM) devices, or other storage devices, such as magnetic media.

Monitoring system 101 includes one or more vehicle system interfaces 106 that allow system 101 to interact with systems in vehicle 102, such as vehicle ignition system 107 and vehicle electrical system 108. Signals exchanged between interface 106 and vehicle ignition system 107 may allow monitoring system 101 to determine the operating status of vehicle 102 and to command the ignition system to start or shutdown the engine of vehicle 102. Signals exchanged between interface 106 and vehicle electrical system 108 may allow monitoring system 101 to determine the status of other vehicle systems and to command other systems to operate. For example, vehicle electrical system 109 may provide control of the vehicle's horn, interior and/or exterior lights, entertainment system, navigation system, heating and/or air conditioning systems, or alarm system.

Vehicle diagnostic system interface 109 provides a connection between monitoring system 101 and vehicle diagnostic system 110. Vehicle diagnostic system 111 may be an on-board diagnostic (OBD) II system or a controller area network (CAN) system in vehicle 102 that is accessed via a port or data bus. The OBD/CAN system provides access to engine performance and status data, speedometer, odometer and tachometer data, and data from other vehicle systems. Power supply 111 provides power to monitoring system 101. Power supply 111 may be a self-contained battery, for example, or it may be coupled to another power source, such as vehicle battery 112. There may be a connection between power supply 111 and vehicle battery 112 or power supply 111 may receive vehicle power via the vehicle's OBD/CAN bus, for example.

In addition to vehicle sensors and diagnostic systems, such as OBD/CAN 111, monitoring system 101 may be coupled to other original equipment and aftermarket sensors in vehicle 102. For example, monitoring system 101 may be coupled to RF transmission sensor 113, which is configured to detect transmissions such as cellular voice and data signals that originate from or are received at vehicle 102. Other sensors may include, for example, seatbelt use sensors, alcohol or ethanol vapor sensors, or cameras.

Monitoring system 101 further includes geographic position locating system 114, which provides location information for vehicle 102, such as a latitude/longitude, street address, or map coordinates, for example. In one embodiment, geographic position locating system 114 may be a global positioning system (GPS) that uses satellite signals to determine location. Other navigation or location-determining systems may also be used, such as inertial navigation systems that update a vehicle's location as it moves from a known position or terrestrial-based radio navigation systems, such as LORAN. In other embodiments, position locating system 114 may use data from cellular network 204 or cellular towers 205 or 206 to determine a geographical location.

Monitoring system 101 includes one or more systems that provide communications with other devices and systems. For example, monitoring system 101 may include cellular or mobile telephone transmitter/receiver 115 that allows system 101 to communicate with other devices and to send or receive data via a cellular or mobile network. Satellite transmitter/receiver 116 allows system 101 to communicate with other devices and to send or receive data via satellite network communications. Bluetooth transmitter/receiver 117 allows system 101 to communicate with other devices that have Bluetooth capability. Data network transmitter/receiver 118 allows system 101 to communicate via networks, such as data communication networks using WiFi, IEEE 802.11, WiMAX, or other standards or protocols, for example. Monitoring system 101 may further include one or more antennas 119 to support such communications. Antennas 119 may be internal to monitoring system 101, may be formed as an integral part of a housing for system 101, or may be externally mounted on vehicle 102. Monitoring system may also include RFID transceiver 120 coupled to antenna 121. RFID transceiver 120 may be operable to detect passive or active RFID tags in vehicle 102 or within a certain distance of vehicle 102.

Vehicle monitoring system may also be used to provide feedback to a driver and passengers in a vehicle. Processor 103 may be configured to identify alarm conditions, such as when vehicle 102 is operated outside of preselected conditions, and to provide feedback or alarms to the driver. Driver feedback system 122 may be coupled to processor 103. Feedback system may be coupled to speaker 123 and/or warning lights 124, for example. Upon detection of an alarm condition, processor 103 may command feedback system 122 to present a warning to the driver, such as an alarm horn or audible tone or message via speaker 123 or a visual warning via warning light 124. Feedback system 122 may also have the capability to provide text messages to a driver, for example, via a display screen (not shown).

Driver performance may be measured using vehicle monitoring equipment that is installed in a vehicle and collects information, such as the vehicle's speed, acceleration, and location. The system may capture data identifying where the vehicle is driven, when the vehicle is driven, and how the vehicle is driven (i.e. driver performance). One embodiment of a vehicle monitoring system is described in U.S. patent application Ser. No. 11/805,237, entitled "System and Method for Monitoring Vehicle Parameters and Driver Behavior," filed May 22, 2007, the disclosure of which is incorporated by reference herein in its entirety. The vehicle monitoring system may receive inputs from internal and external sources and sensors such as accelerometers, geographic position locating systems, global positioning systems (GPS), vehicle on-board diagnostic systems, seatbelt sensors, wireless device, or cell phone use detectors, alcohol vapor detectors, or trans-dermal ethanol detection. The vehicle monitoring system may be used to evaluate and grade driver behavior, as described in U.S. patent application Ser. No. 11/755,556, filed on May 30, 2007, entitled "System and Method for Evaluating Driver Behavior," the disclosure of which is hereby incorporated by reference herein in its entirety. The vehicle monitoring system may also be used to provide feedback and mentoring to the driver in order improve the driver's performance and driving behavior, such as described in U.S. patent application Ser. No. 11/768,056, filed on Jun. 25, 2007, entitled "System and Method for Monitoring and Improving Driver Behavior," the disclosure of which is hereby incorporated by reference herein in its entirety.

Figure 2:
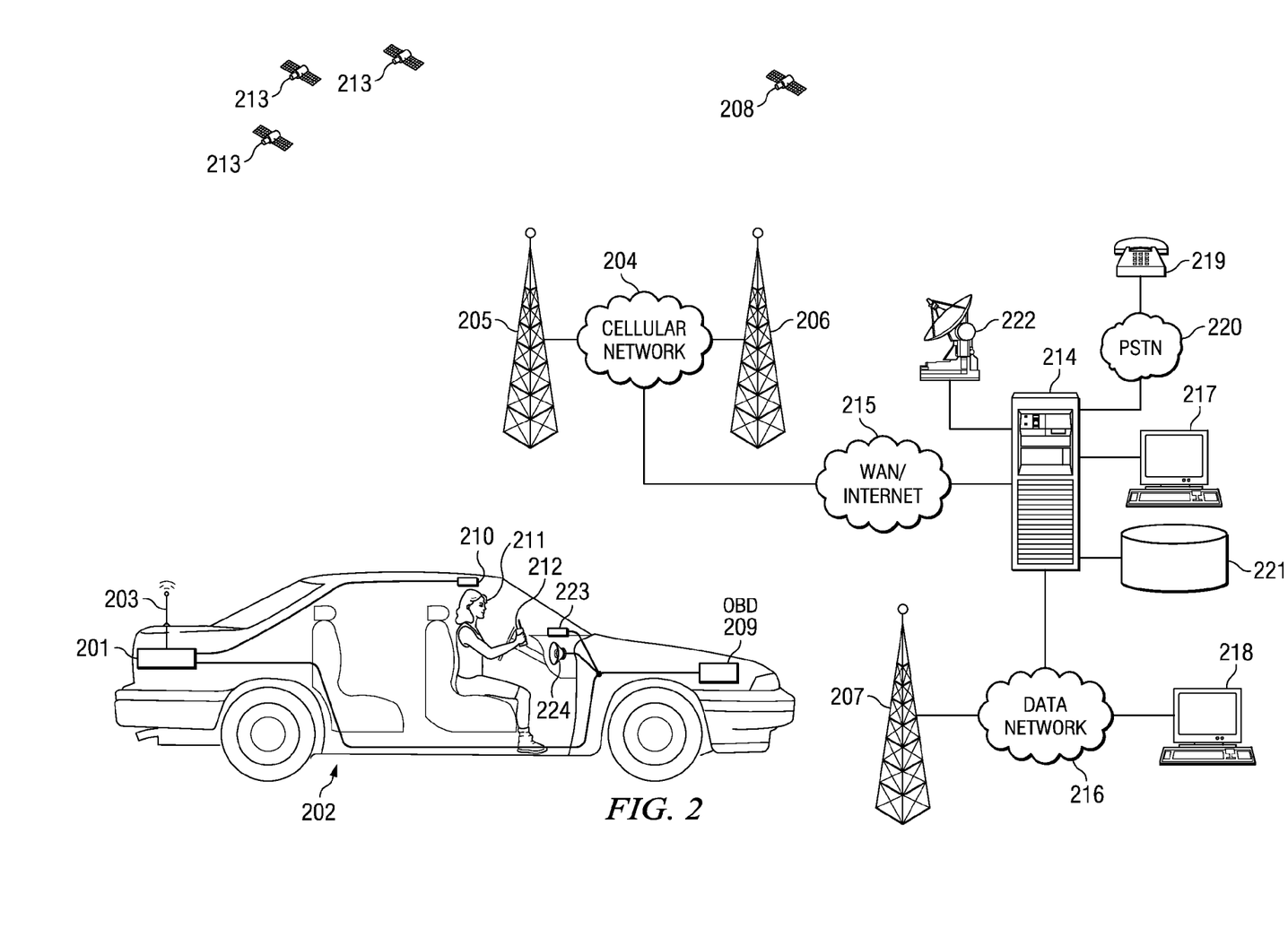
FIG. 2 is a high-level block diagram of a system for detecting wireless device usage in moving vehicles.

FIG. 2 illustrates monitoring system 201 installed or mounted in vehicle 202. Monitoring system 201 may be mounted in any location within vehicle 202, such as in a trunk, under a seat, in a glovebox, or on a window or dashboard. Monitoring system 201 is coupled to one or more antennas 203, which may be used to communicate with one or more satellite or terrestrial communications networks. Monitoring system 201 may be capable of communicating with one or more networks or systems, such as cellular or mobile telephone network 204, having base stations or cell sites 205 and 206, wireless data network 207, such as a Bluetooth, WiFi, WiMAX or 802.11 network, or satellite 208. Monitoring system may also be in communication with or receive signals from satellites 213, which may be part of a geographical position locating system, such as a GPS system.

Monitoring system 201 is coupled to and in data communication with on board diagnostic system 209 in vehicle 202. Vehicle monitoring system 201 has access to certain vehicle operating parameters including, but not limited to, vehicle speed such as via the speedometer, engine speed or throttle position such as via the tachometer, mileage such as via the odometer reading, seat belt status, condition of various vehicle systems including anti-lock-braking (ABS), turn signal, headlight, cruise control activation and a multitude of various other diagnostic parameters such as engine temperature, brake wear, and the like. Monitoring system 201 may also be coupled to driver feedback systems, such as warning lights 223 and/or speaker 224.

Monitoring system 201 may also be coupled to RF transmission detector or sensor 210. RF sensor 210 may operate to detect radio frequency transmissions, such as transmissions in cellular frequency bands that support voice and/or data communications. RF sensor 210 may include an RF receiver circuit having a sensitivity, gain or filter that is adjustable so that only signals above a specified power level are detected. The receiver circuit may be adjusted so that the received signals at sensor 210 are likely to be transmitted from devices that are within a specified range of sensor 210, such as within a few feet or within vehicle 202. Alternatively, sensor 210 may be configured to detect transmissions originating from inside or outside of vehicle 202. For example, RF sensor 210 may be configured to detect signals at frequencies assigned to downlink or reverse-channel transmissions from wireless device 212 to cell sites 205 and 206. Any RF signals detected by sensor 210 may be provided to monitoring system 201. A processor, such as processor 103 (FIG. 1), in monitoring system 201 may be configured to extract messages or content from the RF signals and to process the messages or content to identify specific fields, such as destination or source addresses, routing data, and/or message type fields.

Vehicle driver or operator 211 may have wireless device 212, such as a cellular, mobile or satellite telephone, personal digital assistant (PDA), two-way pager, mobile messaging device, such as a Blackberry® or Treo®, or similar device. Wireless device 212 may also be capable of communicating with one or more networks, such as cellular or mobile telephone network 204, cell towers or base stations 205 and 206, wireless data network 207, or satellite network 208. Sensor 210 may be configured to detect transmissions associated with the same network used by wireless device 212.

Server 214 may be used in embodiments to identify situations in which a mobile phone is used in a moving vehicle. Server 214 may be any processor-based system that is capable of communicating with external networks and processing data associated with wireless device usage and vehicle monitoring systems. Server 214 may be coupled to multiple networks, such as cellular network 204 or wireless data network 207, via networks 215 and 216, which couple server 214 to other communication networks, may be any public or private data network, such as an Internet, intranet, extranet, or wide or local area network (WAN/LAN). Server 214 may be coupled to satellite 208 via antenna 222. In one embodiment, users may communicate with server 214 via a local or remote personal computer (PC), laptop computer, or terminal, such as devices 217 or 218. Alternatively, server 214 may communicate with users via a wireless device or a wireline connection, such as telephone 219, which may be coupled to public switched telephone network (PSTN) 220.

Memory 221 may be used to store information, such as user account data. In one embodiment, the user account data includes information such as user contact information, billing data, passwords, personal identification numbers (PIN), or other security data, vehicle identification numbers (VIN) for users' vehicles, identifiers for monitoring systems in users' vehicles, and identifiers for users' wireless telephones, such as telephone numbers, electronic serial numbers (ESN), mobile equipment identifier (MEID), international mobile equipment identifier (IMEI), Temporary Mobile Subscriber Identity (TMSI), or international mobile subscriber identity (IMSI). Server 214 may access data stored on memory 221 and may store data to memory 221. Users may access memory 221, for example, to enter, update, or edit account data, via terminals or computers 217 and 218. Memory 221 may be internal or external to server 214 and may be located near to or remote from server 214.

The systems and methods described herein determine when a wireless device, such as mobile telephone or PDA 212, is in use and when a vehicle associated with the wireless device, such as vehicle 202, is moving. The system and methods disclosed herein may further evaluate, determine or confirm if the wireless device is in the moving vehicle.

In one embodiment, real-time data provided by a cellular network service provider is used to detect when a driver may be using a wireless device while driving. For example, a service provider for cellular network 204 may provide wireless device activity data to server 214 in real-time or near real-time. This data may be an indication that wireless devices are currently in use or have recently been in use. Network 204 may provide activity data for all wireless device users on its network to server 214. Alternatively, network 204 may provide activity data only for certain, predetermined wireless devices, such as wireless devices for users with accounts stored in memory 221. The wireless device activity data may indicate that a particular wireless device is being used for a voice call, a data call, a text message or other communication.

Upon receiving the wireless device activity, server 214 may search memory 221 to identify any user accounts associated with the wireless devices that are in use. If a user account is identified, then server 214 identifies a monitoring system, such as device 201, associated with that user account. Server 214 then determines if any vehicles (201) associated with device 202 are moving. Monitoring system 201 may be configured to notify server 214 when vehicle 202 is moving, such as by sending a message when the vehicle first moves and additional message at regular or irregular intervals. Such messages may include data such as a vehicle location, vehicle operating status and/or any alarm conditions or triggers. Alternatively, server 214 may query monitoring system 201 to determine if vehicle 202 is moving. Communication between monitoring system 201 and server 214 may be via cellular network 204, data network 207 and/or communication satellite network 208 depending upon availability of each network, the urgency of the message, and/or user configuration.

If server 214 identifies a situation in which a user's wireless device is in use and the user's car is in motion, then server 214 may determine that the driver is using a wireless device while driving. Server 214 may then take action to record, report and/or mentor this behavior. For example, a user may configure server 214 to take certain action upon detecting that a wireless device 212 is being used during operation of vehicle 201. Server 214 may command monitoring system 201 to broadcast warnings, such as audible messages or tones or visual lights or text, to the driver of vehicle 202. Additionally, server 214 may report the wireless device use to the driver's parent, supervisor, fleet manager or other authority. In other embodiments, server 214 may be configured to command cellular network 204 to terminate calls to device 212 or to block all non-emergency use of wireless device 212.

For example, cellular network 204 may detect a voice or text communication from or to wireless device 212. Network 204 provides an activity message to server 214. The wireless activity message may provide a wireless device identifier, such as a telephone number, ESN, MEID, IMEI, TMSI, or IMSI. The wireless device activity message may also identify a start time and/or end time for the wireless device activity or an indication that the wireless device is currently active. Server uses the wireless device identifier to find a user account for wireless device 212 stored in memory 221. From the user account, server 214 may identify a vehicle monitoring system, such as device 201 installed in vehicle 202, that is associated with wireless device 212. Server 214 then determines if vehicle 202 is moving using recent reports from device 201 or by querying device 201 for a status report. If vehicle 202 has been moving during the wireless activity, then server 214 identifies a potentially unsafe driving event. This event may trigger any number of actions preselected by the user and/or default actions in server 214.

The user may configure server 214 to send warning feedback to vehicle 202 upon detection of a potentially unsafe driving condition, such as using a cell phone to talk or text while driving. Such messages may warn against using a wireless device while driving and/or direct the driver to discontinue use of the wireless device while driving. Server 214 may also be configured to command cellular network 204 to terminate any current communications connection for wireless device 212 and/or to prevent communications connections to device 212 for a period of time or until further notification. Server 214 may also provide a report or notification to a supervisor or authority of the potentially unsafe driving conditions, such as by calling a fleet manager or parent via telephone 219 or by sending an email or text message to the supervisor.

In other embodiments, server 214 may first detect when vehicle 202 is moving and then determine if an associated wireless device 212 is in use. For example, upon receiving a notification from device 201 that vehicle 202 is moving, server 214 searches the user account associated with vehicle 202 to identify corresponding wireless devices. Upon identifying a wireless device 212, server 214 may query, command or request usage activity reports from network 204. For example, server 214 may query network 204 one or more times regarding the current status of device 212, or server 214 may command or request network 204 to identify any future wireless activity for device 212, either for a set period of time or for indefinitely. Upon receiving a notification of wireless communications using device 212 while vehicle 202 is moving, server 214 may take further action, as described above, to warn or mentor the driver, notify a supervisor, or otherwise document the event.

It will be understood that users may have multiple wireless devices and/or multiple vehicles. Additionally, individual wireless devices and vehicles may be used by multiple parties. A user account may include identifiers for one or more wireless devices, and identifiers for one or more vehicles (or for monitoring equipment 201 in vehicles). Accordingly, when server 214 receives notification that a particular wireless device is in use, two or more vehicles may be associated with that wireless device. If one of the vehicles is moving and one is not moving, server 214 may require additional information to determine if the wireless device is in the moving vehicle. For example, information that indicates the proximity of a wireless device (212) to a particular vehicle (202) may assist server 214 to determine if the wireless device is being used in a moving vehicle.

In an embodiment, wireless device 212 is equipped with an RFID tag or other RFID transponder or device. The user account data may include RFID tag or transponder information for the users' wireless devices. Monitoring system 201 may include an RFID sensor or transceiver, such as RFID system 120 (FIG. 1), that allows device 201 to interrogate RFID tags or transponders within or near vehicle 202. Monitoring system 201 may periodically, at regular or irregular intervals, query, detect or scan for RFID tags or transponders. For example, when vehicle 202 is started, when vehicle 202 is moved, or at other intervals, monitor 201 may search of RFID tags. If any RFID tags are detected by monitor 201, the identifier for those tags may be used to determine if the RFID tags are associated with a wireless device. The RFID tag identifier may be sent to server 214 by monitor 201. Server 214 may then process user account data to determine if the RFID tag is linked to a wireless device that is associated with vehicle 202. If the RFID tag identifier is linked to wireless device 212, then server 214 may determine that the user's own phone is present in the vehicle. If the RFID tag identifier is unknown or associated with another users' wireless device, and the RFID tag for wireless device 212 is not reported by monitor 201, then server 214 will know that the user's wireless device is not present in the vehicle. Accordingly, when wireless device 212 is in use and vehicle 202 is in motion, server 214 may not identify a potentially unsafe situation if wireless device 212 has not been currently linked to vehicle 202 using RFID detection. On the other hand, if an RFID tag for wireless device 212 has been detected near vehicle 202, and vehicle 202 is moving, then server 214 may identify a potentially unsafe condition if wireless device 212 is then used. Accordingly, RFID may be used to reduce or eliminate false detections of unsafe driving behavior.

Similarly, other technologies may be used to determine if a wireless device is in or near an associated vehicle. For example, wireless device 212 may be equipped with a Bluetooth transceiver, which would allow wireless device 212 to communicate via Bluetooth with monitoring device 201, if device 201 is also Bluetooth equipped, such as with circuit 117 (FIG. 1). Wireless device 212 and monitoring system 201 may communicate with each other via a Bluetooth connection. Because Bluetooth has a limited distance capability, it can be assumed that wireless device is in or near vehicle 202 if a Bluetooth connection is established between wireless device 212 and monitoring system 201. It will be understood that the transmit power, receive sensitivity and other transmission characteristics of Bluetooth circuit 117 and wireless device 212 may be adjusted to limit the range Bluetooth communications associated with monitoring system 201. For example, the range of the Bluetooth connections may be reduced to a distance that increases the likelihood that a wireless device must be in vehicle 202 in order to establish such a connection. The Bluetooth connection may be established merely to register wireless device 212 with monitoring system 201, or to exchange other messages or data, such as to provide a hands-free operation for wireless device 212 using equipment in vehicle 202. As discussed above with respect to identification of RFID tags, monitoring system 201 may also report to server 214 when Bluetooth connections have been established with wireless devices.

When monitoring system 201 reports vehicle movement to server 214, the message from monitoring system 201 may include a list of any wireless devices detected in or near vehicle 202 using Bluetooth, RFID or other short-range communication technologies. In the case of Bluetooth, if the Bluetooth identifier is unknown or associated with another users' wireless device, and the Bluetooth identifier for wireless device 212 is not reported by monitor 201, then server 214 will know that the user's wireless device is likely not present in the vehicle. Accordingly, when wireless device 212 is in use and vehicle 202 is in motion, server 214 may not identify a potentially unsafe situation if wireless device 212 has not been currently linked to vehicle 202 using Bluetooth identifier. On the other hand, if a Bluetooth identifier for wireless device 212 has been detected near vehicle 202, and vehicle 202 is moving, then server 214 may identify a potentially unsafe condition if wireless device 212 is then used. Accordingly, Bluetooth or other short-range communication technologies may also be used to reduce or eliminate false detections of unsafe driving behavior.

In another embodiment, server 214 may detect wireless device usage in a moving vehicle without requiring or using data from an in-vehicle monitoring system. Cellular network may report wireless device activity to server 214 for a particular device 212. The activity report may include, for example, a time of use and a location of use. The location may identify a specific cell site, such as cells 205 and 206, that is or was in communication with wireless device 212. The wireless activity report from network 204 to server 214 may be made at regular or irregular intervals or upon the occurrence of some event, such as handover from one cell to another. If server 214 identifies a situation in which network 204 reports use activity for wireless device 212 in cell 205 in one message and then reports use activity for wireless device 212 in cell 206, then server 214 may identify a situation in which wireless device is being used while moving. If server 214 does not also have movement reports for vehicle 202 and/or monitoring system 201, then it will be unclear if the user is driving his car while talking on device 212. Accordingly, server 214 may only report a potentially unsafe situation to the user or a supervisor, but may not initiate feedback to vehicle 202 and may not direct network 204 to terminate the call.

In other embodiments, monitoring system may detect wireless device usage using on-board sensors. For example, RF sensor 210 may detect when an RF device, such as wireless device 212, is being used in or near vehicle 202. RF sensor 210 may be configured to capture or detect RF transmissions in a frequency band used by wireless device 212, such as messages in a cellular frequency band. RF sensor 210 may simply detect the presence of RF transmissions, and provide those messages or a notification of such transmissions to monitoring system 201. Based upon the strength of the transmissions, RF sensor 210 and/or monitoring system 201 may determined that the transmissions are likely to have originated within or near vehicle 202. RF sensor 210 and/or monitoring system 201 may be further capable of processing captured transmissions and to extract data from the transmissions, such as an origination or destination address or a message type.

Monitoring system 201 may use message origination data to determine if the transmissions were sent by a known wireless device. For example, monitoring system may include data for one or more wireless devices that are associated with vehicle 202, such as identifier information for wireless device 212. If monitoring system 201 determines that the origination or destination address of captured messages are associated with wireless device 212, then monitoring system 201 may further determine that wireless device is being used. Additional message data, such as message type and the number of transmissions observed or captured by RF sensor 210 may provide further information to assist monitoring system 201 to evaluate if wireless device 212 is actually being used for communication or wireless device is merely registered with network 204, but not in use.

Monitoring system 201 is capable of determining when vehicle 202 is in motion, such as a change in GPS or other positioning location or a detection of velocity from the vehicle's speedometer via OBD 209. If monitoring system 201 detects both motion of vehicle 202 and RF transmissions associated with wireless device 212, then monitoring system 201 may determine that a driver is using wireless device 212 while driving vehicle 202. As noted above, monitoring system 201 may provide mentoring feedback or warnings to the driver upon detection of a potentially unsafe driving condition. Monitoring system 201 may also send a message to server 214 upon detection of cell phone usage via sensor 210. Server 214 may provide additional reports or notification to the user's supervisor regarding a potentially unsafe condition. Server 214 and/or monitoring system 201 may be further configured to command network 204 to terminate or prevent calls to wireless device 212 upon detection of potentially unsafe wireless device usage while driving.

In other embodiments, wireless device 212 may include a position locating system, such as a GPS location circuit, chip or component. Wireless device 212 may also be capable of determining its location using other methods, such as by using cellular network location data. Using its location capability, wireless device 212 may be further capable of detecting movement, such as when a geographical location changes over time or from one measurement to the next. Wireless device 212 may use such location-change information to calculate a speed or velocity. Wireless device 212 may be configured to notify network 204 and/or server 214, or some other entity, when its speed or velocity exceeds a specific rate. For example, if the speed of wireless device 212 exceeds 10 MPH, device 212 may be programmed to notify server 214 or network 204. Server 214 may compare such location notification data with wireless communication activity reports from server 204, for example, to determine if wireless device 212 is being used in a potentially unsafe manner. Server 214 may provide mentoring feedback, warnings or third party notifications, as discussed above, in such situations.

Wireless device 212 is also aware of when it transmits or receives data on a voice or data call or when text message data is being sent or received. If wireless device 212 detects motion and is communicating with network 204 or another network, wireless device 212 may terminate the communication, provide mentoring feedback to the user, and/or provide reports or notifications to third party entities, such as a supervisor or parent. Wireless device 212 may be configured to automatically end communications when it (212) detects movement in excess of a preset minimum. Upon detection of the motion threshold, wireless device 212 may terminate any current communications and/or prevent any further communications.

Upon termination of communication with wireless device 212 due to motion, such as when the user may be driving a vehicle while talking on a cell phone, wireless network 204 may be configured to queue messages until communication is reestablished with wireless device 212. For example, if server 214, monitoring system 201 or device 212 instructs network 204 to terminate or block communications with wireless device 212, network 204 may queue or store any text, email or other messages until notified that wireless device 212 has stopped moving. Network 204 may further queue or store notifications of voicemail and other services in order to minimize distraction to the user while driving. Upon detection or notification that wireless device 212 is no longer moving, network 204 may forward the stored email, text messages, and other data to wireless device 212 since the user does not appear to be still operating a vehicle.

In another embodiment, server 214 may be used to detect wireless device usage after the fact. Network 204 may provide wireless activity data at intervals after the wireless use has been completed. For example, network 204 may provide billing information to server 214 for past wireless activity. Sever 214 may use the past activity data obtained from the billing data to determine when a user's wireless device was in use. After determining when the wireless device was in use, server 214 may obtain stored vehicle movement data, such as from memory 221. Server 214 then may compare the time of wireless device usage to vehicle movement records to determine if the user was using the wireless device at the same time that the user's vehicle was in motion. If it appears that such a situation occurred, server 214 may provide a report or other notification to the user, a supervisor or other authority.

Monitoring system 201 and server 214 may collect vehicle operation data for use in evaluating and/or grading the performance of a driver. For example, such as system is described in U.S. patent application Ser. No. 11/768,056, filed on Jun. 25, 2007, entitled "System and Method for Monitoring and Improving Driver Behavior," the disclosure of which is hereby incorporated by reference herein in its entirety. It will be understood that data associated with identifying that or when a driver used a wireless device while driving may be used to monitor and/or improve a driver's behavior.

In another embodiment, monitoring system 201 and/or vehicle 202 may include a device that selectively prevents devices from connecting to a wireless network. For example, a jammer that broadcasts noise or interference on cellular frequency bands, or a device that blocks or interferes with call set-up messages, may be used to prevent a wireless device from operating while a vehicle is in motion. Such a system may be installed in vehicle 202 under the control of monitoring system 201 so that, upon detection of vehicle motion, monitoring system 201 may command the jammer or interference circuit to prevent wireless device usage within the vehicle.

Figure 3:
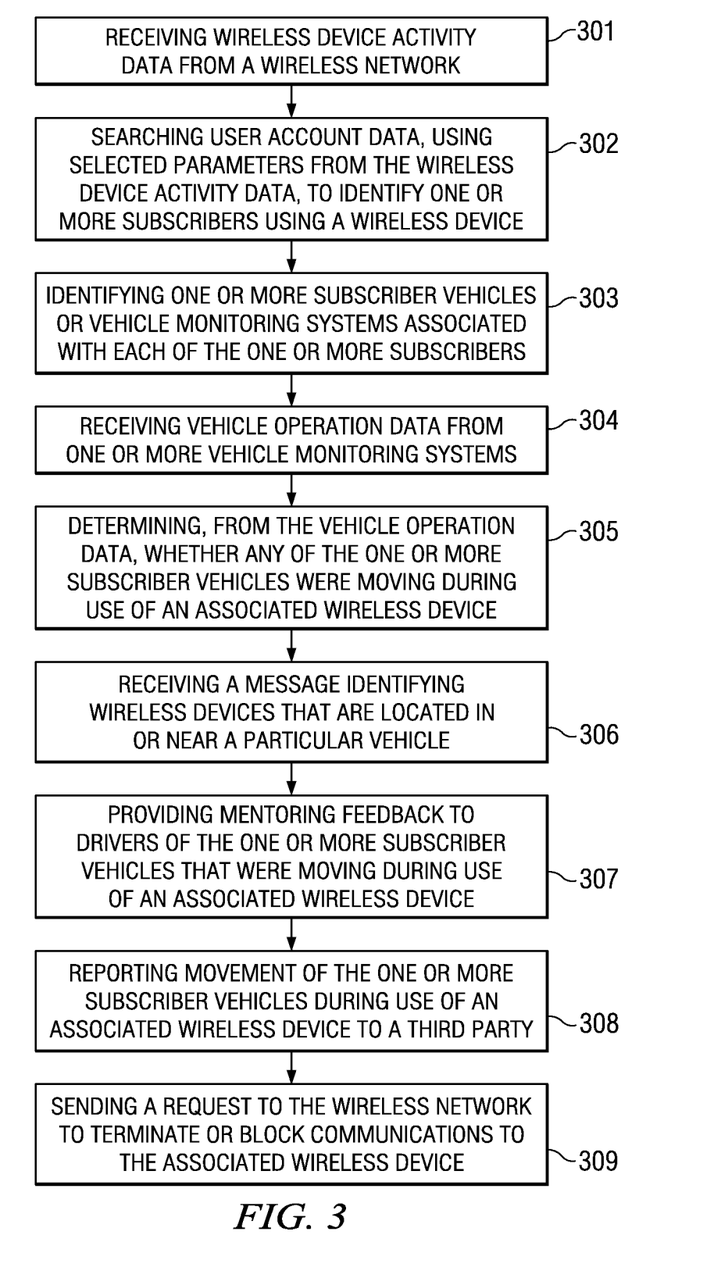
FIG. 3 is a flowchart illustrating a method according to one embodiment described herein.

FIG. 3 illustrates a flowchart for an exemplary embodiment of a method for detecting use of a wireless device in a moving vehicle. The method illustrated in FIG. 3 may be implemented, for example, using server 214 (FIG. 2), but is not intended to be limited to such a configuration. Moreover, it will be understood that the steps of the methods illustrated in FIGS. 3-6 may be performed in the order indicated, or in any other order, or simultaneously, or in conjunction with other steps or methods. In step 301, a wireless device activity data is received from a wireless network. In step 302, user account data is searched using selected parameters from the wireless device activity data to identify one or more subscribers that are or were using a wireless device. In step 303, one or more subscriber vehicles or vehicle monitoring systems associated with each of the one or more subscribers are identified. In step 304, vehicle operation data from one or more vehicle monitoring systems is received. In step 305, it is determined, using the vehicle operation data, whether any of the one or more subscriber vehicles were moving during use of an associated wireless device.

In step 306, a message identifying wireless devices that are located in or near a particular vehicle is received. The wireless devices that are located in or near a particular vehicle may be determined using a short-range communications system, an RFID system, or a Bluetooth system or a combination of one or more of such systems. In step 307, mentoring feedback may be provided to drivers of the one or more subscriber vehicles that were moving during use of an associated wireless device. The mentoring feedback may be in the form of audible and/or visual warnings, messages, text or tones that are played in the vehicle to the driver. In step 308, the use of a wireless device during movement of the one or more subscriber vehicles is reported to a third party, such as a fleet manager, parent, supervisor, or other authority. The report may be made immediately or after a period of time, such as in a periodic report. The report may be via a telephone call, text message, email message, postal mail, or in any other form. In step 309, a request or command is sent to the wireless network to terminate or block communications to the associated wireless device. The communications with the associated wireless device may be blocked or terminated for a specific period of time or indefinitely.

Figure 4:
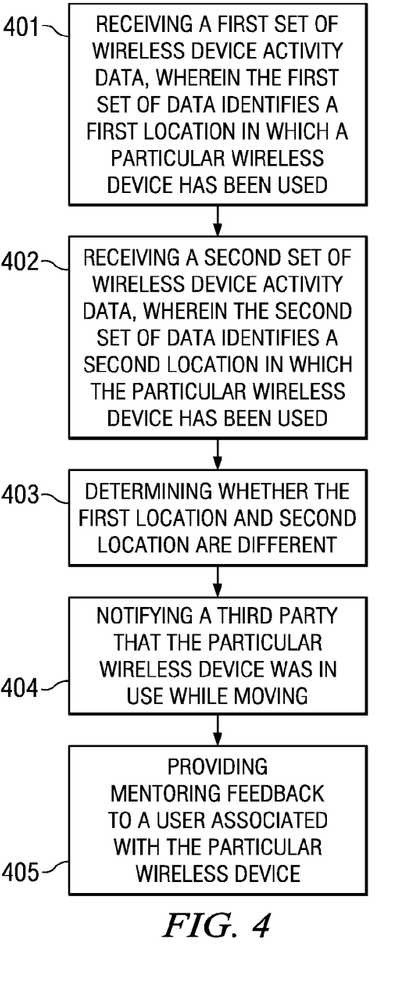
FIG. 4 is a flowchart illustrating a method according to an embodiment described herein.

FIG. 4 illustrates a flowchart for an exemplary embodiment of a method for detecting use of a wireless device in a moving vehicle. The method illustrated in FIG. 4 may be implemented, for example, in a device such as server 214, monitoring system 201, or wireless device 212 (FIG. 2), but is not intended to be limited to such configurations. In step 401, a first set of wireless device activity data is received. The first set of data identifies a first location in which a particular wireless device has been used. In step 402, a second set of wireless device activity data is received. The second set of data identifies a second location in which the particular wireless device has been used. The wireless device activity data in steps 401 and 402 may be received from a wireless device, wireless network, or from a vehicle monitoring system.

In step 403, the first location and second location are compared or otherwise analyzed to determine if they are different locations. If the locations are different, then it can be determined or assumed that the wireless device has been moving while in use. In step 404, a third party is notified that the particular wireless device was in use while moving. The third party may be, for example, a parent of a teen driver, a vehicle owner, or a supervisor or fleet manager of a commercial, public, or municipal vehicle. In step 405, mentoring feedback is provided to a user associated with the particular wireless device. For example, the user may be a driver of a vehicle who receives a warning or instructions to terminate use of the wireless device. In one embodiment, the third party notification of step 404 may be delayed until it is determined if the user terminates the user of the wireless device following the mentoring feedback provided in step 405.

Figure 5:
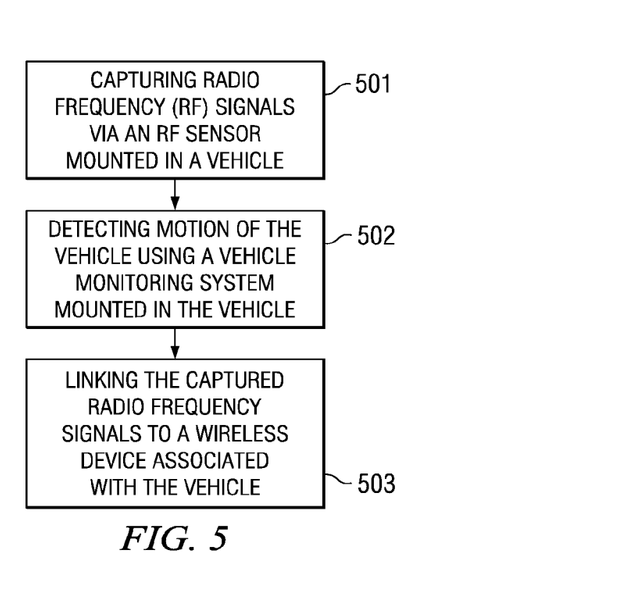
FIG. 5 is a flowchart illustrating a method according to another embodiment described herein.

FIG. 5 illustrates a flowchart for an exemplary embodiment of a method for detecting use of a wireless device. The method illustrated in FIG. 5 may be implemented, for example, in a device such as monitoring system 201 (FIG. 2), but is not intended to be limited to such configurations. In step 501, radio frequency (RF) signals are captured via an RF sensor mounted in a vehicle. In step 502, motion of the vehicle is detected using a vehicle monitoring system mounted in the vehicle. The motion of the vehicle may be detected by sensing inertia of the vehicle, detecting a change in vehicle location, or detecting a vehicle speed from an on-board diagnostic system, speedometer or tachometer, for example. In step 503, the captured radio frequency signals are linked to a wireless device associated with the vehicle. The captured RF signals may be linked to a wireless device using source or destination address data in the RF signals, such as by detecting messages being sent to or from a particular device. The captured RF signals may also be linked to the wireless device based upon a signal strength of the captured RF signals, such as by detecting transmissions from within the vehicle. The captured RF signals may be linked to the wireless device based upon a message type of the captured RF signals, such as a call set-up message initiated from near the vehicle.

Figure 6:
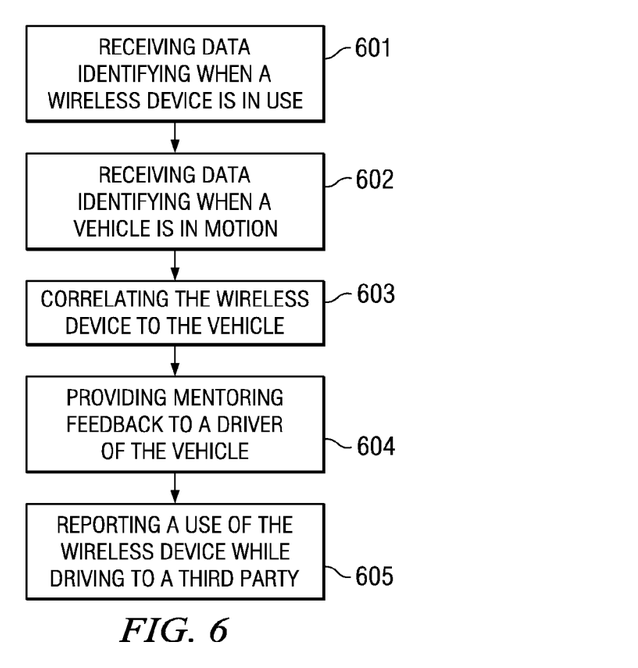
FIG. 6 is a flowchart illustrating a method according to a further embodiment described herein.

FIG. 6 illustrates a flowchart for an exemplary embodiment of a method for detecting use of a wireless device. The method illustrated in FIG. 6 may be implemented, for example, in a device such as server 214, monitoring system 201, or wireless device 212 (FIG. 2), but is not intended to be limited to such configurations. In step 601, data identifying when a wireless device is in use is received. In step 602, data identifying when a vehicle is in motion is received. In step 603, the wireless device is correlated to the vehicle. In step 604, mentoring feedback is provided to a driver of the vehicle. In step 605, use of the wireless device while driving is reported to a third party. It will be understood, that step 605 may or may not be dependent upon the driver's response to step 604. For example, if the driver stops using the wireless device within a predetermined time limit of when the mentoring feedback is provided, then the third party notification may not occur.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for detecting wireless device use in a moving vehicle, comprising:
   a computing system receiving data that indicates that a wireless device is being used in a moving vehicle;
   the computing system determining that the wireless device is being used by a user of the moving vehicle;
   the computing system, in response to determining that the wireless device is being used by the user of the moving vehicle, sending a command to a monitoring system that is communicatively coupled to the moving vehicle for operably causing an audible warning to be rendered by a speaker in the moving vehicle, the audible warning instructing the user to discontinue use of the particular mobile device in the moving vehicle, the audible warning being provided without disabling any use of the particular mobile device; and
   determining whether the user has terminated use of the particular mobile device after a predetermined period of time subsequent to providing the audible warning to discontinue use of the particular mobile device.

2. The method of claim 1, further comprising: determining a speed associated with the moving vehicle; and
   notifying the third party if the speed is greater than a predetermined threshold.

3. The method recited in claim 1, wherein the moving vehicle includes a radio frequency (RF) sensor mounted in the moving vehicle, the RF sensor operable to:
   detect a signal associated with a wireless device, wherein the signal is in a wireless communication frequency band and comprises an address of the wireless device; and
   wherein the moving vehicle further includes a vehicle monitoring system mounted in the moving vehicle, the vehicle monitoring system communicatively coupled to the RF sensor and comprising a processor operable to:
   process data received from vehicle systems and sensors;
   determine when the moving vehicle is moving based on the data received from vehicle systems and sensors; and
   determine that the wireless device is associated with the moving vehicle based at least in part on the detected signal.

4. The method of claim 3, wherein the processor or RF sensor is configured to identify a source or destination address for the detected signal in the wireless communication frequency band.

5. The method of claim 3, wherein the method further includes:
   capturing radio frequency (RF) signals from the wireless device via an RF sensor mounted in the moving vehicle; and
   evaluating the RF signals to identify a destination address, a routing data and message type associated with the RF signals.

6. The method recited in claim 1, the method further comprising:
   capturing radio frequency (RF) signals via an RF sensor mounted in the moving vehicle, wherein each radio frequency signal is in a wireless communication frequency band and comprises an address of a wireless device associated with the moving vehicle;
   detecting motion of the moving vehicle using a vehicle, monitoring system mounted in the vehicle;
   linking the captured radio frequency signals to the wireless device associated with the vehicle based at least in part on at least one captured radio frequency signal;
   determining that the wireless device is being used by the driver of the moving vehicle in response to detecting the motion of the moving vehicle and the wireless device being associated with the vehicle; and
   notifying the third party that the wireless device was in use while the vehicle was in motion.

7. The method of claim 6, wherein the captured RF signals are linked to the wireless device associated with the moving vehicle using source or destination address data in the RF signals.

8. The method of claim 6, wherein the captured RF signals are linked to the wireless device associated with the moving vehicle further based at least in part upon a signal strength of the captured RF signals.

9. The method of claim 6, wherein the captured RF signals are linked to the wireless device associated with the moving vehicle further based at least in part upon a message type of the captured RF signals.

10. The method of claim 1, wherein the method further includes using warning lights that are located in the moving vehicle to emit light in combination with the audible warning instructing the driver to discontinue use of the particular mobile device.

11. The method of claim 1, wherein the method further includes controlling an operation of the moving vehicle in response to determining that the wireless device is being used by the driver of the moving vehicle.

12. The method of claim 1, wherein the method further includes notifying a third party that the particular wireless device was in use in the moving vehicle if the user uses the particular wireless device for a time period exceeding the predetermined period of time after the user is provided the audible warning that provides instructions for discontinuing use of the particular mobile device.

13. The method of claim 11, wherein controlling an operation of the moving vehicle includes controlling an engine of the moving vehicle.

14. The method of claim 12, wherein the method further includes notifying the third party with a telephone message.

15. The method of claim 12, wherein the method further includes notifying the third party with an email message.

16. The method of claim 12, wherein the method further includes notifying the third party with a text message.

17. A computing system comprising:
   at least one processor; and
   at least one storage device having stored computer executable instructions which, when executed by the at least one processor, implement method for detecting wireless device use in a moving vehicle, the method comprising:
      the computing system receiving data that indicates that a wireless device is being used in the moving vehicle;
      the computing system determining that the wireless device is being used by a user of the moving vehicle;
      the computing system, in response to determining that the wireless device is being used by the user of the moving vehicle, sending a command to a monitoring system that is communicatively coupled to the moving vehicle for operably causing an audible warning to be rendered by a speaker in the moving vehicle, the audible warning instructing the user to discontinue use of the particular mobile device in the moving vehicle, the audible warning being provided without disabling any use of the particular mobile device; and
      determining whether the user has terminated use of the particular mobile device after a predetermined period of time subsequent to providing the audible warning to discontinue use of the particular mobile device.

18. The system of claim 17, wherein determining that the particular wireless device is being used by the driver of the moving vehicle comprises:
   the computing system identifying a user account associated with the particular wireless device; and
   the computing system determining whether the user account links the particular wireless device with the moving vehicle in a stored account record, wherein the command is only sent to the monitoring system upon first determining that the user account associates the particular wireless device to the moving vehicle in the stored account record.

19. The system of claim 17, wherein receiving data that indicates that a wireless device is being used in the moving vehicle comprises:
   receiving cellular network data that indicates activity of the particular wireless device with a first cellular network cite as well as with a second cellular network cite.

20. The system of claim 19, wherein the cellular network data is received in a report that is generated in response to the cellular network detecting a handover of communications with the particular wireless device from the first cellular network cite to the second cellular network cite.

21. The system of claim 17, wherein determining that the wireless device is being used by a driver of the moving vehicle comprises:
   requesting use data of the particular wireless device from a network in response to detecting movement of the moving vehicle and upon identifying that the particular wireless device is associated with the moving vehicle in a stored user account, wherein the use data indicates use of the wireless device during the detected movement of the moving vehicle.

22. The system of claim 21, wherein the method further includes requesting future use data from the network corresponding to future use of the particular wireless device occurring for a specified period of time in the future.

23. The system of claim 21, wherein the use data is past use data corresponding to previous use of the particularly wireless device.

24. The system of claim 17, wherein the user is a driver of the vehicle.

25. The system of claim 17, wherein the method further includes notifying a third party that the particular wireless device was in use in the moving vehicle if the user uses the particular wireless device for a time period exceeding the predetermined period of time after the user is provided the audible warning that provides instructions for discontinuing use of the particular mobile device.

26. At least one storage device having stored computer executable instructions which, when executed by at least one processor, implement method for detecting wireless device use in a moving vehicle, the method comprising:
   a computing system receiving data that indicates that a wireless device is being used in a moving vehicle;

the computing system determining that the wireless device is being used by a user of the moving vehicle;

the computing system, in response to determining that the wireless device is being used by the user of the moving vehicle, sending a command to a monitoring system that is communicatively coupled to the moving vehicle for operably causing an audible warning to be rendered by a speaker in the moving vehicle, the audible warning instructing the user to discontinue use of the particular mobile device in the moving vehicle, the audible warning being provided without disabling any use of the particular mobile device; and determining whether the user has terminated use of the particular mobile device after a predetermined period of time subsequent to providing the audible warning to discontinue use of the particular mobile device.

27. The storage device of claim 26, wherein the use of particular mobile device comprises texting.

28. The storage device of claim 26, wherein the method further includes notifying a third party that the particular wireless device was in use in the moving vehicle if the user uses the particular wireless device for a time period exceeding the predetermined period of time after the user is provided the audible warning that provides instructions for discontining use of the particular mobile device.

* * * * *